US012051373B2

(12) United States Patent
Cho et al.

(10) Patent No.: US 12,051,373 B2
(45) **Date of Patent: *Jul. 30, 2024**

(54) SCAN DRIVER AND DISPLAY DEVICE

(71) Applicant: SAMSUNG DISPLAY CO., LTD., Yongin-si (KR)

(72) Inventors: Seong Heon Cho, Hwaseong-si (KR); Hae-Kwan Seo, Hwaseong-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/306,211

(22) Filed: Apr. 24, 2023

(65) Prior Publication Data

US 2023/0260464 A1 Aug. 17, 2023

Related U.S. Application Data

(63) Continuation of application No. 17/666,425, filed on Feb. 7, 2022, now Pat. No. 11,636,810, which is a (Continued)

(30) Foreign Application Priority Data

Oct. 11, 2019 (KR) ........................ 10-2019-0125980

(51) Int. Cl.
*G09G 3/3266* (2016.01)
*G09G 3/3275* (2016.01)

(52) U.S. Cl.
CPC ......... *G09G 3/3266* (2013.01); *G09G 3/3275* (2013.01); *G09G 2310/0278* (2013.01); *G09G 2310/0294* (2013.01)

(58) Field of Classification Search
CPC ............... G09G 3/3266; G09G 3/3275; G09G 2310/0278; G09G 2310/0294;
(Continued)

(56) References Cited

U.S. PATENT DOCUMENTS

2007/0089000 A1* 4/2007 Shin ..................... G09G 3/3266 714/726
2016/0111055 A1* 4/2016 Na ....................... G09G 3/3666 345/94

(Continued)

FOREIGN PATENT DOCUMENTS

KR 10-2015-0142708 A 12/2015
KR 10-2016-0070446 A 6/2016

*Primary Examiner* — Md Saiful A Siddiqui
(74) *Attorney, Agent, or Firm* — Lewis Roca Rothgerber Christie LLP

(57) ABSTRACT

A scan driver includes: a plurality of stages, each stage including: a logic circuit configured to transfer an input signal to a first node in response to a first clock signal, and to bootstrap the first node in response to a second clock signal; a carry output circuit configured to output the second clock signal as a carry signal that is provided as the input signal for a next stage in response to a voltage of the bootstrapped first node; and a masking controller configured to receive a masking signal and the carry signal, and to output the masking signal as a scan signal provided to a pixel row corresponding to the each stage in response to the carry signal.

18 Claims, 16 Drawing Sheets

Related U.S. Application Data continuation of application No. 16/888,465, filed on May 29, 2020, now Pat. No. 11,244,629.

(58) Field of Classification Search
CPC ......... G09G 3/3677; G09G 2310/0213; G09G 2310/0286; G09G 2310/08; G09G 2320/103; G09G 2340/0435; G09G 3/3208; G09G 2310/024
See application file for complete search history.

(56) References Cited

U.S. PATENT DOCUMENTS

| | | | | |
|---|---|---|---|---|
| 2016/0217728 | A1 | 7/2016 | In et al. | |
| 2017/0124958 | A1* | 5/2017 | Pyo | G09G 3/3291 |
| 2017/0186363 | A1* | 6/2017 | Park | G09G 3/3266 |
| 2018/0012550 | A1 | 1/2018 | Lim et al. | |
| 2018/0075809 | A1 | 3/2018 | Chang et al. | |
| 2018/0240382 | A1 | 8/2018 | Choi et al. | |
| 2019/0164513 | A1 | 5/2019 | Wu | |
| 2020/0066210 | A1* | 2/2020 | Yuan | G09G 3/3266 |

* cited by examiner

@TP1~TP2

@TP2~TP3

@TP3~TP4

SCAN DRIVER AND DISPLAY DEVICE

CROSS-REFERENCE TO RELATED APPLICATIONS

This application is a continuation of U.S. patent application Ser. No. 17/666,425, filed Feb. 7, 2022, which is a continuation of U.S. patent application Ser. No. 16/888,465, filed May 29, 2020, now U.S. Pat. No. 11,244,629, which claims priority to and the benefit of Korean Patent Application No. 10-2019-0125980, filed Oct. 11, 2019, the entire content of all of which is incorporated herein by reference.

BACKGROUND

1. Field

Aspects of some example embodiments of the present inventive concept relate to a display device.

2. Description of the Related Art

Reduction of power consumption may be beneficial in a display device employed in a portable device, such as a smartphone, a tablet computer, etc. In order to reduce the power consumption of display devices, a low frequency driving technique, which drives or refreshes a display panel at a frequency lower than a normal driving frequency, may be utilized.

However, in a display device to which the low frequency driving technique is applied, when a still image is not displayed in an entire region of a display panel, or when the still image is displayed only in a partial region of the display panel, the entire region of the display panel may be driven at the normal driving frequency. Thus, in this case, the low frequency driving may not be performed, and the power consumption may not be reduced.

The above information disclosed in this Background section is only for enhancement of understanding of the background and therefore the information discussed in this Background section does not necessarily constitute prior art.

SUMMARY

Aspects of some example embodiments of the present inventive concept relate to a display device and, for example, to a display device that performs multi-frequency driving (MFD).

Some example embodiments provide a scan driver capable of providing a plurality of scan signals at different driving frequencies to a plurality of pixel rows.

Some example embodiments provide a display device including the scan driver.

According to some example embodiments, a scan driver includes a plurality of stages. Each stage includes a logic circuit configured to transfer an input signal to a first node in response to a first clock signal, and to bootstrap the first node in response to a second clock signal, a carry output unit configured to output the second clock signal as a carry signal that is provided as the input signal for a next stage in response to a voltage of the bootstrapped first node, and a masking control unit configured to receive a masking signal and the carry signal, and to output the masking signal as a scan signal provided to a pixel row corresponding to the each stage in response to the carry signal.

According to some example embodiments, the masking signal may have an on level or an off level according to a driving frequency of a panel region including the pixel row in a first active period of the carry signal. The masking control unit may output the scan signal having the on level when the masking signal has the on level, and may output the scan signal having the off level when the masking signal has the off level.

According to some example embodiments, a second active period of the masking signal in which the masking signal has the on level may at least partially overlap the first active period of the carry signal.

According to some example embodiments, an end time point of the second active period of the masking signal may lead an end time point of the first active period of the carry signal.

According to some example embodiments, the masking control unit may include a first transistor including a gate receiving the carry signal, a first terminal coupled to a scan output node at which the scan signal is output, and a second terminal receiving the masking signal.

According to some example embodiments, the masking control unit may include a second transistor including a gate coupled to a second node, a first terminal receiving a gate off voltage, and a second terminal coupled to the scan output node.

According to some example embodiments, the carry output unit may include a third transistor including a gate coupled to the first node, a first terminal coupled to a carry output node at which the carry signal is output, and a second terminal receiving the second clock signal, and a fourth transistor including a gate coupled to a second node, a first terminal receiving a gate off voltage, and a second terminal coupled to the carry output node.

According to some example embodiments, the logic circuit may include an input unit configured to transfer the input signal to a third node in response to the first clock signal, a stress relaxing unit between the first node and the third node, and configured to transfer the input signal from the third node to the first node such that the voltage of the first node is changed to a first on level, a bootstrap unit configured to change the voltage of the first node from the first on level to a second on level by bootstrapping the first node based on the second clock signal, the second on level having an absolute value greater than an absolute value of the first on level, a holding unit configured to hold a second node as an off level while the carry signal is output, and a stabilizing unit configured to periodically apply a gate on voltage to the second node in response to the second clock signal, and to periodically apply a gate off voltage to the third node in response to the first clock signal after the carry signal is output.

According to some example embodiments, the input unit may include a fifth transistor including a gate receiving the first clock signal, a first terminal receiving the input signal, and a second terminal coupled to the third node.

According to some example embodiments, the stress relaxing unit may include a sixth transistor including a gate receiving the gate on voltage, a first terminal coupled to the third node, and a second terminal coupled to the first node.

According to some example embodiments, the bootstrap unit may include a first capacitor including a first electrode coupled to a carry output node at which the carry signal is output, and a second electrode coupled to the first node.

According to some example embodiments, the holding unit may include a seventh transistor including a gate coupled to the third node, a first terminal coupled to the second node, and a second terminal receiving the first clock signal.

According to some example embodiments, the stabilizing unit may include an eighth transistor including a gate receiving the first clock signal, a first terminal coupled to the second node, and a second terminal receiving the gate on voltage, a ninth transistor including a gate coupled to the second node, a first terminal receiving the gate off voltage, and a second terminal, a tenth transistor including a gate receiving the second clock signal, a first terminal coupled to the second terminal of the ninth transistor, and a second terminal coupled to the third node, and a second capacitor including a first electrode receiving the gate off voltage, and a second electrode coupled to the second node.

According to some example embodiments, a scan driver includes a plurality of stages. Each stage includes a first transistor including a gate coupled to a carry output node, a first terminal coupled to a scan output node, and a second terminal receiving a masking signal, a second transistor including a gate coupled to a second node, a first terminal receiving a gate off voltage, and a second terminal coupled to the scan output node, a third transistor including a gate coupled to a first node, a first terminal coupled to the carry output node, and a second terminal receiving a second clock signal, a fourth transistor including a gate coupled to the second node, a first terminal receiving the gate off voltage, and a second terminal coupled to the carry output node, a fifth transistor including a gate receiving a first clock signal, a first terminal receiving an input signal, and a second terminal coupled to a third node, a sixth transistor including a gate receiving a gate on voltage, a first terminal coupled to the third node, and a second terminal coupled to the first node, a first capacitor including a first electrode coupled to the carry output node, and a second electrode coupled to the first node, a seventh transistor including a gate coupled to the third node, a first terminal coupled to the second node, and a second terminal receiving the first clock signal, an eighth transistor including a gate receiving the first clock signal, a first terminal coupled to the second node, and a second terminal receiving the gate on voltage, a ninth transistor including a gate coupled to the second node, a first terminal receiving the gate off voltage, and a second terminal, a tenth transistor including a gate receiving the second clock signal, a first terminal coupled to the second terminal of the ninth transistor, and a second terminal coupled to the third node, and a second capacitor including a first electrode receiving the gate off voltage, and a second electrode coupled to the second node.

According to some example embodiments, the first transistor may output the masking signal as a scan signal provided to a pixel row corresponding to the each stage at the scan output node in response to the carry signal output at the carry output node.

According to some example embodiments, the masking signal may have an on level or an off level according to a driving frequency of a panel region including the pixel row in a first active period of the carry signal. The first transistor may output the scan signal having the on level when the masking signal has the on level, and may output the scan signal having the off level when the masking signal has the off level.

According to some example embodiments, a display device includes a display panel including a plurality of pixel rows, a data driver configured to provide data signals to each of the plurality of pixel rows, a scan driver configured to provide a plurality of scan signals to the plurality of pixel rows, respectively, and a controller configured to control the data driver and the scan driver. The scan driver includes a plurality of stages. Each state includes a logic circuit configured to transfer an input signal to a first node in response to a first clock signal, and to bootstrap the first node in response to a second clock signal, a carry output unit configured to output the second clock signal as a carry signal that is provided as the input signal for a next stage in response to a voltage of the bootstrapped first node, and a masking control unit configured to receive a masking signal and the carry signal, and to output the masking signal as one of the plurality of scan signals provided to a pixel row corresponding to the each stage among the plurality of pixel rows in response to the carry signal.

According to some example embodiments, the controller may include a still image detection block configured to divide input image data into a plurality of panel region data for a plurality of panel regions each including at least one of the plurality of pixel rows, and to determine whether each of the plurality of panel region data represents a still image, a driving frequency decision block configured to determine a plurality of driving frequencies for the plurality of panel regions according to whether each of the plurality of panel region data represents the still image, and a scan driver control block configured to generate the masking signal based on the plurality of driving frequencies for the plurality of panel regions.

According to some example embodiments, the driving frequency decision block may determine a first driving frequency of the plurality of driving frequencies for a first panel region of the plurality of panel regions as a normal driving frequency in a case where first panel region data of the plurality of panel region data for the first panel region represents a moving image, and may determine a second driving frequency of the plurality of driving frequencies for a second panel region of the plurality of panel regions as a low driving frequency lower than the normal driving frequency in a case where second panel region data of the plurality of panel region data for the second panel region represents the still image. To output a first scan signal of the plurality of scan signals in all of a plurality of frame periods to a first pixel row of the plurality of pixel rows included in the first panel region driven at the normal driving frequency, the scan driver control block may generate the masking signal having an on level in all of active periods of the carry signal generated by a first stage of the plurality of stages coupled to the first pixel row. To output a second scan signal of the plurality of scan signals in a portion of the plurality of frame periods to a second pixel row of the plurality of pixel rows included in the second panel region driven at the low driving frequency, the scan driver control block may generate the masking signal having the on level in a portion of active periods of the carry signal generated by a second stage of the plurality of stages coupled to the second pixel row, and having an off level in a remaining portion of the active periods of the carry signal generated by the second stage.

According to some example embodiments, the plurality of stages may include odd-numbered stages coupled in series with each other, the odd-numbered stages configured to provide corresponding scan signals of the plurality of scan signals to odd-numbered pixel rows of the plurality of pixel rows, and even-numbered stages coupled in series with each other, the even-numbered stages configured to provide corresponding scan signals of the plurality of scan signals to even-numbered pixel rows of the plurality of pixel rows.

As described above, in a scan driver and a display device according to some example embodiments, each stage may include a masking control unit that outputs a masking signal as a scan signal provided to a corresponding pixel row.

Accordingly, the scan driver according to some example embodiments may provide a plurality of scan signals at different driving frequencies to a plurality of pixel rows.

BRIEF DESCRIPTION OF THE DRAWINGS

Illustrative, non-limiting example embodiments will be more clearly understood from the following detailed description in conjunction with the accompanying drawings.

DETAILED DESCRIPTION

Hereinafter, aspects of some example embodiments of the present inventive concept will be explained in more detail with reference to the accompanying drawings.

Figure 1:
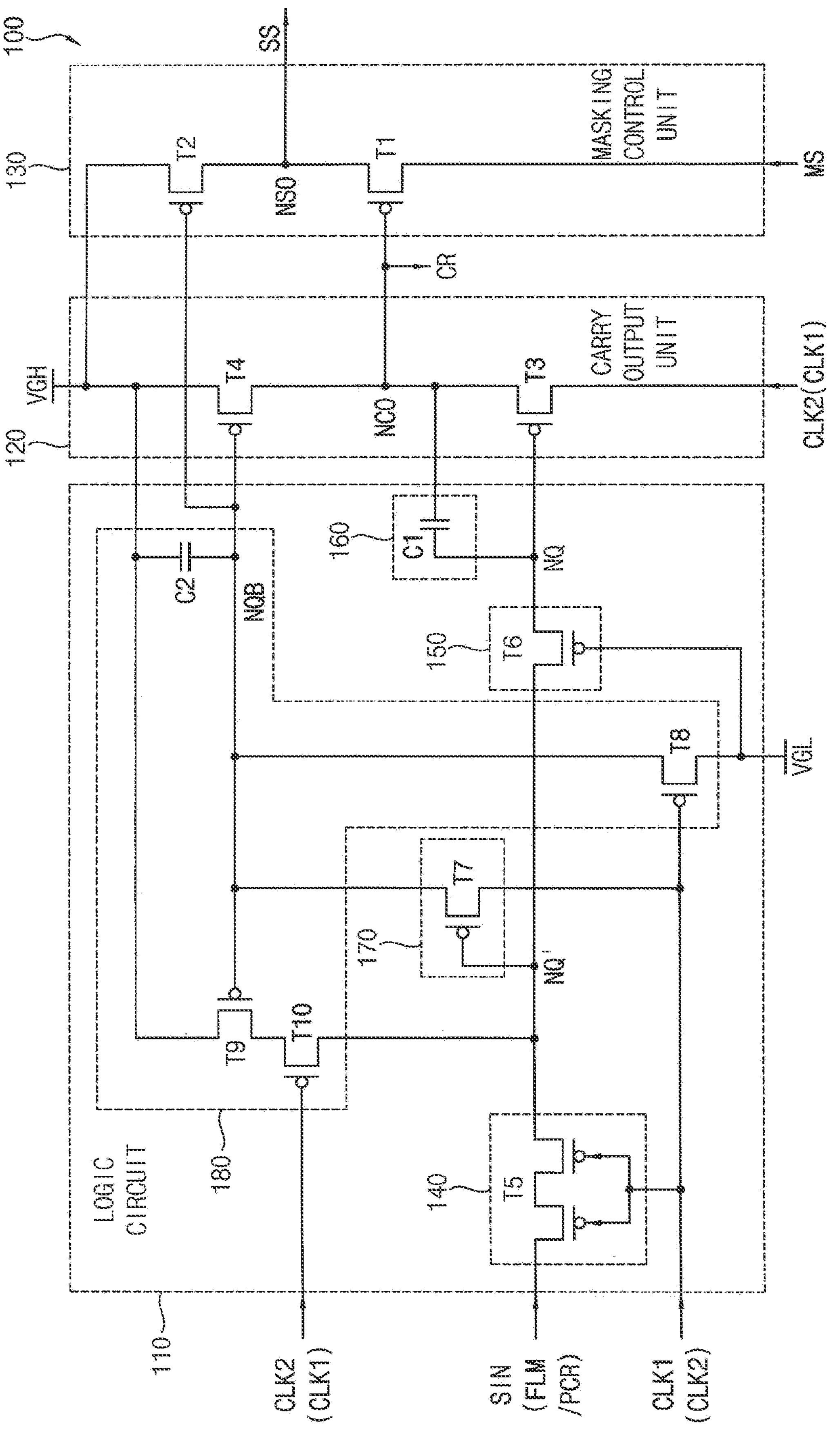
FIG. 1 is a circuit diagram illustrating each stage included in a scan driver according to some example embodiments.

FIG. 1 is a circuit diagram illustrating each stage included in a scan driver according to some example embodiments.

Referring to FIG. 1, a scan driver according to some example embodiments may include a plurality of stages, and each stage 100 may include a logic circuit 110, a carry output unit (or carry output or carry output circuit) 120, and a masking control unit (or masking controller or masking control circuit) 130. The plurality of stages may receive an input signal SIN, a first clock signal CLK1, a second clock signal CLK2 and a masking signal MS, may sequentially generate a plurality of carry signals CR based on the input signal SIN, the first clock signal CLK1 and the second clock signal CLK2, and selectively output respective scan signals SS according to the masking signal MS.

The logic circuit 110 may transfer the input signal SIN to a first node NQ in response to the first clock signal CLK1, and may bootstrap the first node N1 in response to the second clock signal CLK2. In some example embodiments, a first stage of the plurality of stages may receive a scan start signal FLM as the input signal SIN, and each of the remaining stages may receive the carry signal PCR of a previous stage as the input signal SIN. Further, according to some example embodiments, as illustrated in FIG. 1, the logic circuit 110 of each odd-numbered stage of the plurality of stages may transfer the input signal SIN to the first node NQ in response to the first clock signal CLK1, and may bootstrap the first node N1 in response to the second clock signal CLK2. Further, the logic circuit 110 of each even-numbered stage of the plurality of stages may transfer the input signal SIN to the first node NQ in response to the second clock signal CLK2, and may bootstrap the first node N1 in response to the first clock signal CLK1.

According to some example embodiments, as illustrated in FIG. 1, the logic circuit 110 may include an input unit (or input or input circuit) 140, a stress relaxing unit (or stress relaxer or stress relaxing circuit) 150, a bootstrap unit (or bootstrapper or bootstrap circuit) 160, a holding unit (or holder or holding circuit) 170, and a stabilizing unit (or stabilizer or stabilizing circuit) 180.

The input unit 140 may transfer the input signal SIN to a third node NQ' in response to the first clock signal CLK1. In some example embodiments, the stress relaxing unit 150 may be located at a Q node, and thus the Q node may be divided by the stress relaxing unit 150 into the first node NQ and the third node NQ'. Thus, the stress relaxing unit 150 may be located between the first node NQ and the third node NQ' (e.g., such that when current passes through the stress relaxing unit 150, the first node NQ and the third node NQ' are electrically connected, for example, to form a single node). The input unit 140 may be coupled to the third node NQ'. In some example embodiments, the input unit 140 may include a fifth transistor T5 including a gate electrode receiving the first clock signal CLK1, a first terminal receiving the input signal SIN, and a second terminal coupled to the third node NQ'. Further, in some example embodiments, as illustrated in FIG. 1, the fifth transistor T5 may be implemented with, but is not limited to being implemented with, a dual transistor including two transistors connected in series.

The stress relaxing unit 150 may be located between the first node NQ and the third node NQ', and may transfer the input signal SIN from the third node NQ' to the first node NQ. By the input signal SIN transferred to the first node NQ, a voltage of the first node NQ may be changed to a first on level. In some example embodiments, the stress relaxing unit 150 may include a sixth transistor T6 including a gate electrode receiving a gate on voltage VGL (e.g., a low gate voltage), a first terminal coupled to the third node NQ', and a second terminal coupled to the first node NQ.

The bootstrap unit 160 may change the voltage of the first node NQ from the first on level to a second on level by bootstrapping the first node NQ based on the second clock signal CLK2. The second on level may have an absolute value greater than an absolute value of the first on level. In some example embodiments, the first on level may be a first low level, and the second on level may be a second low level lower than the first low level. Further, a voltage level difference between the first on level (e.g., the first low level) and the second on level (e.g., the second low level) may correspond to, but is not limited to, a voltage level difference between an off level (e.g., a high level) and the first on level (e.g., the first low level). In some example embodiments, the bootstrap unit 160 may include a first capacitor C1 including a first electrode coupled to a carry output node NCO at which the carry signal CR is output, and a second electrode coupled to the first node NQ.

The holding unit 170 may hold a second node NQB as the off level (e.g., the high level) while the carry signal CR is output. In some example embodiments, the holding unit 170 may include a seventh transistor T7 including a gate electrode coupled to the third node NQ', a first terminal coupled to the second node NQB, and a second terminal receiving the first clock signal CLK1.

After the carry signal CR is output, the stabilizing unit 180 may periodically apply the gate on voltage VGL to the second node NQB in response to the second clock signal CLK2, and to periodically apply a gate off voltage VGH (e.g., a high gate voltage) to the third node NQ' in response to the first clock signal CLK1. The gate off voltage VGH applied to the third node NQ' may be transferred to the first node NQ by the sixth transistor T6, and thus the gate off voltage VGH may be periodically applied also to the first node NQ.

In some example embodiments, the stabilizing unit 180 may include an eighth transistor T8 including a gate electrode receiving the first clock signal CLK1, a first terminal coupled to the second node NQB, and a second terminal receiving the gate on voltage VGL, a ninth transistor T9 including a gate electrode coupled to the second node NQB, a first terminal receiving the gate off voltage VGH, and a second terminal, a tenth transistor T10 including a gate electrode receiving the second clock signal CLK2, a first terminal coupled to the second terminal of the ninth transistor T9, and a second terminal coupled to the third node NQ', and a second capacitor C2 including a first electrode receiving the gate off voltage VGH, and a second electrode coupled to the second node NQB.

The carry output unit 120 may output the second clock signal CLK2 as the carry signal CR that is provided as the input signal SIN for the next stage in response to the voltage of the bootstrapped first node N1, or the voltage of the first node N1 having the second on level. In some example embodiments, the carry output unit 120 may include a third transistor T3 including a gate coupled to the first node NQ, a first terminal coupled to the carry output node NCO at which the carry signal CR is output, and a second terminal receiving the second clock signal CLK2, and a fourth transistor T4 including a gate electrode coupled to the second node NQB, a first terminal receiving the gate off voltage VGH, and a second terminal coupled to the carry output node NCO.

The masking control unit 130 may receive the masking signal MS and the carry signal CR, and may output the masking signal MS as the scan signal SS provided to a pixel row corresponding to the each stage 100 in response to the carry signal CR. In some example embodiments, the masking control unit 130 may include a first transistor T1 including a gate coupled to the carry output node NCO at which the carry signal CR is output, a first terminal coupled to a scan output node NSO at which the scan signal SS is output, and a second terminal receiving the masking signal MS, and a second transistor T2 including a gate coupled to the second node NQB, a first terminal receiving the gate off voltage VGH, and a second terminal coupled to the scan output node NSO.

In some example embodiments, the scan driver may be included in a display device that performs multi-frequency driving (MFD) that drives a plurality of panel regions each including at least one pixel row at a plurality of driving frequencies. A controller of the display device may provide each stage 100 with the masking signal MS having an on level (e.g., the first on level) or an off level according to the driving frequency of the panel region including the pixel row in an active period of the carry signal CR. Further, the masking control unit 130 may output the scan signal SS having the on level when the masking signal MS has the on level. Further, the masking control unit 130 may output the scan signal SS having the off level when the masking signal MS has the off level, or may not output the scan signal SS having the on level. That is, each stage 100 may selectively output the scan signal SS (having the on level) according to the masking signal MS in the active period of the carry signal CR.

In the scan driver according to some example embodiments, each stage 100 may output the masking signal MS as the scan signal SS in response to the carry signal CR. Thus, the plurality of stages 100 of the scan driver may sequentially generate the plurality of carry signals CR, and may selectively output the respective scan signals SS according to the masking signal MS in the active periods of the plurality of carry signals CR. Accordingly, the scan driver according to some example embodiments may provide the plurality of scan signals SS to a plurality of pixel rows at different driving frequencies.

Hereinafter, an example of an operation of the stage 100 will be described in more detail below with reference to FIGS. 1 through 7.

Figure 2:
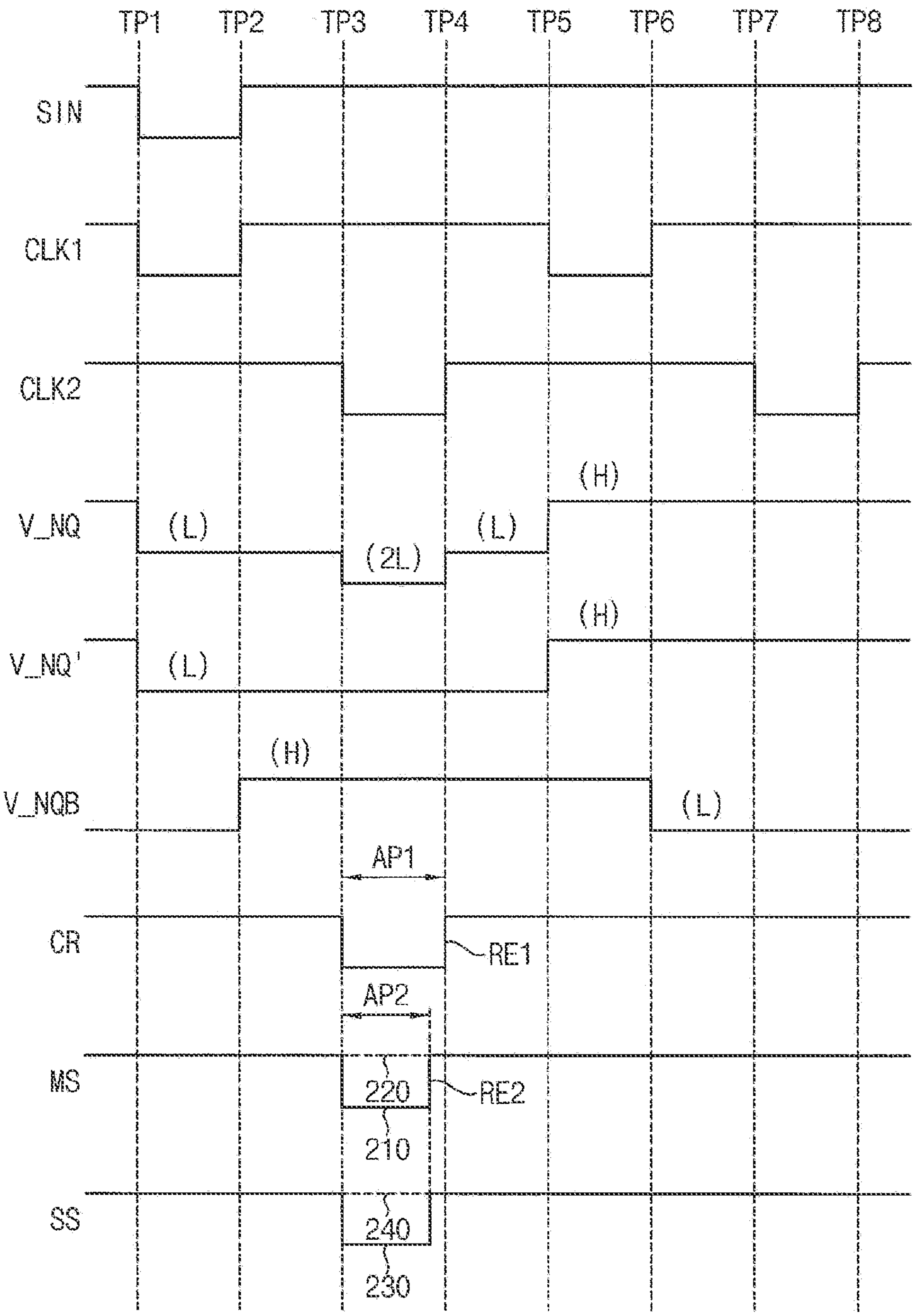
FIG. 2 is a timing diagram for describing an example of an operation of a stage of FIG. 1.

FIG. 2 is a timing diagram for describing an example of an operation of a stage of FIG. 1, and FIGS. 3 through 7 are circuit diagrams for describing an example of an operation of a stage of FIG. 1.

Referring to FIGS. 1 and 2, each stage 100 may receive an input signal SIN and a first clock signal CLK1, a second clock signal CLK2, and a masking signal MS. The input signal SIN may be a scan start signal FLM with respect to a first stage of a plurality of stages included in a scan driver, and may be a carry signal CR of the previous stage with respect to the remaining stages of the plurality of stages. Further, the first and second clock signals CLK1 and CLK2 may have difference phases (e.g., opposite phases).

The masking signal MS may have an on level 210 (e.g., a first low level L) or an off level 220 (e.g., a high level H) according to a driving frequency of a panel region including a pixel row corresponding to each stage 100 in a first active period AP1 of the carry signal CR. For example, in a case where the driving frequency of the panel region is a normal driving frequency (e.g., about 60 Hz or about 120 Hz), the masking signal MS may have the on level 210 in all of the first active periods AP1 in a plurality of frame periods.

In another example, in a case where the driving frequency of the panel region is a low driving frequency lower than the normal driving frequency, the masking signal MS may have the on level 210 in a portion of the first active periods AP1 in the plurality of frame periods, and may have the off level 220 in the remaining portion of the first active periods AP1 in the plurality of frame periods. Further, in some example embodiments, with respect to each of the first and second clock signals CLK1 and CLK2, an active period (or an on period) may be shorter than an inactive period (or an off period) as illustrated in FIG. 2.

For example, a duty cycle of each of the first and second clock signals CLK1 and CLK2 may be, but is not limited to, from about 20% to about 40%. In other example embodiments, the active period of each of the first and second clock signals CLK1 and CLK2 may be longer than or equal to the inactive period of each of the first and second clock signals CLK1 and CLK2. In FIGS. 1 through 7, an example where first through tenth transistors T1 trough T10 are PMOS transistors, a first on level is a first low level L, a second on level is a second low level 2L, an off level is a high level H, a gate on voltage is a low gate voltage VGL, and a gate off voltage is a high gate voltage VGH is illustrated.

Figure 3:
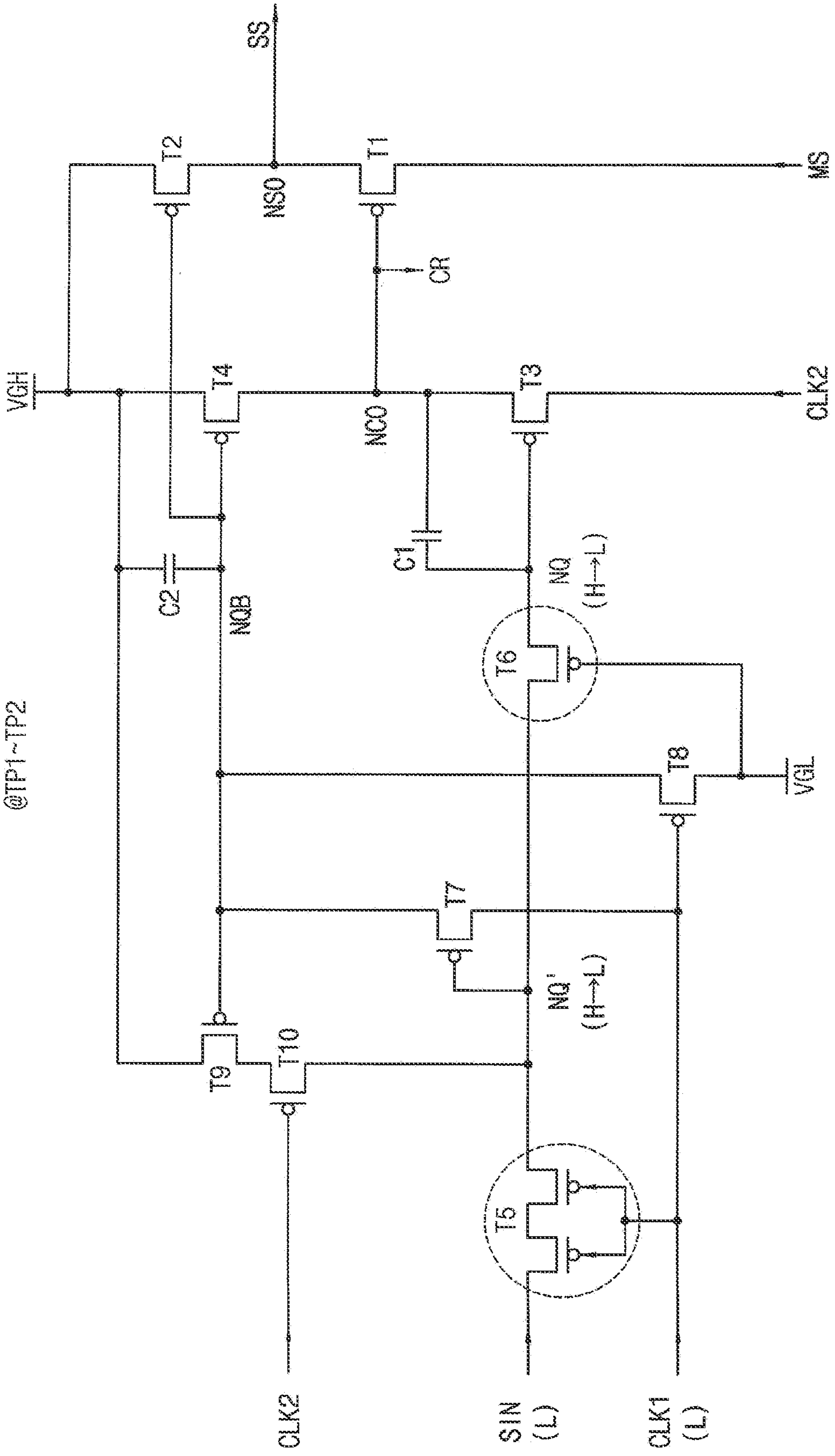
FIGS. 3 through 7 are circuit diagrams for describing an example of an operation of a stage of FIG. 1.

In a period from a first time point TP1 to a second time point TP2, the input signal SIN having the first low level L may be applied, and the first clock signal CLK1 having the first low level L may be applied. In this case, as illustrated in FIG. 3, the fifth transistor T5 may be turned on in response to the first clock signal CLK1 having the first low level L, and the sixth transistor T6 may be turned on in response to the low gate voltage VGL having the first low level L.

The input signal SIN may be transferred by the turned-on fifth transistor T5 to a third node NQ', and thus a voltage V_NQ' of the third node NQ' may be changed from the high level H to the first low level L. Further, the input signal SIN at the third node NQ' may be transferred by the turned-on sixth transistor T6 to a first node NQ, and thus a voltage V_NQ of the first node NQ may be changed from the high level H to the first low level L.

Figure 4:
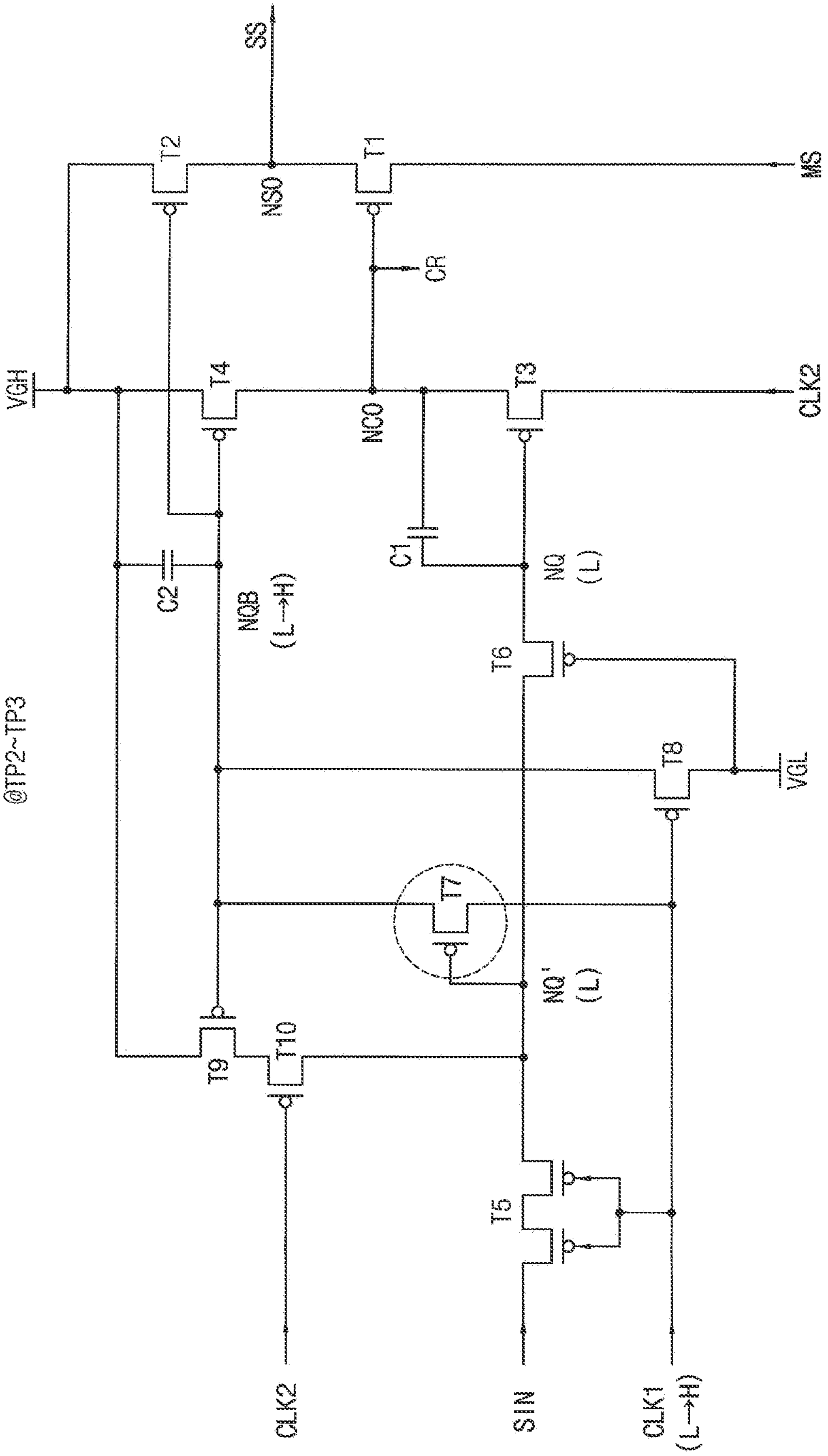

The first clock signal CLK1 may be changed from the first low level L to the high level H at the second time point TP2, and the first clock signal CLK1 having the high level H may be applied in a period from the second time point TP2 to a third time point TP3. In this case, as illustrated in FIG. 4, the seventh transistor T7 may be turned on in response to the voltage V_NQ of the first node NQ having the first low level L. The first clock signal CLK1 having the high level H may be transferred by the turned-on seventh transistor T7 to a second node NQB, and a voltage V_NQB of the second node NQB may be changed from the first low level L to the high level H.

Figure 5:
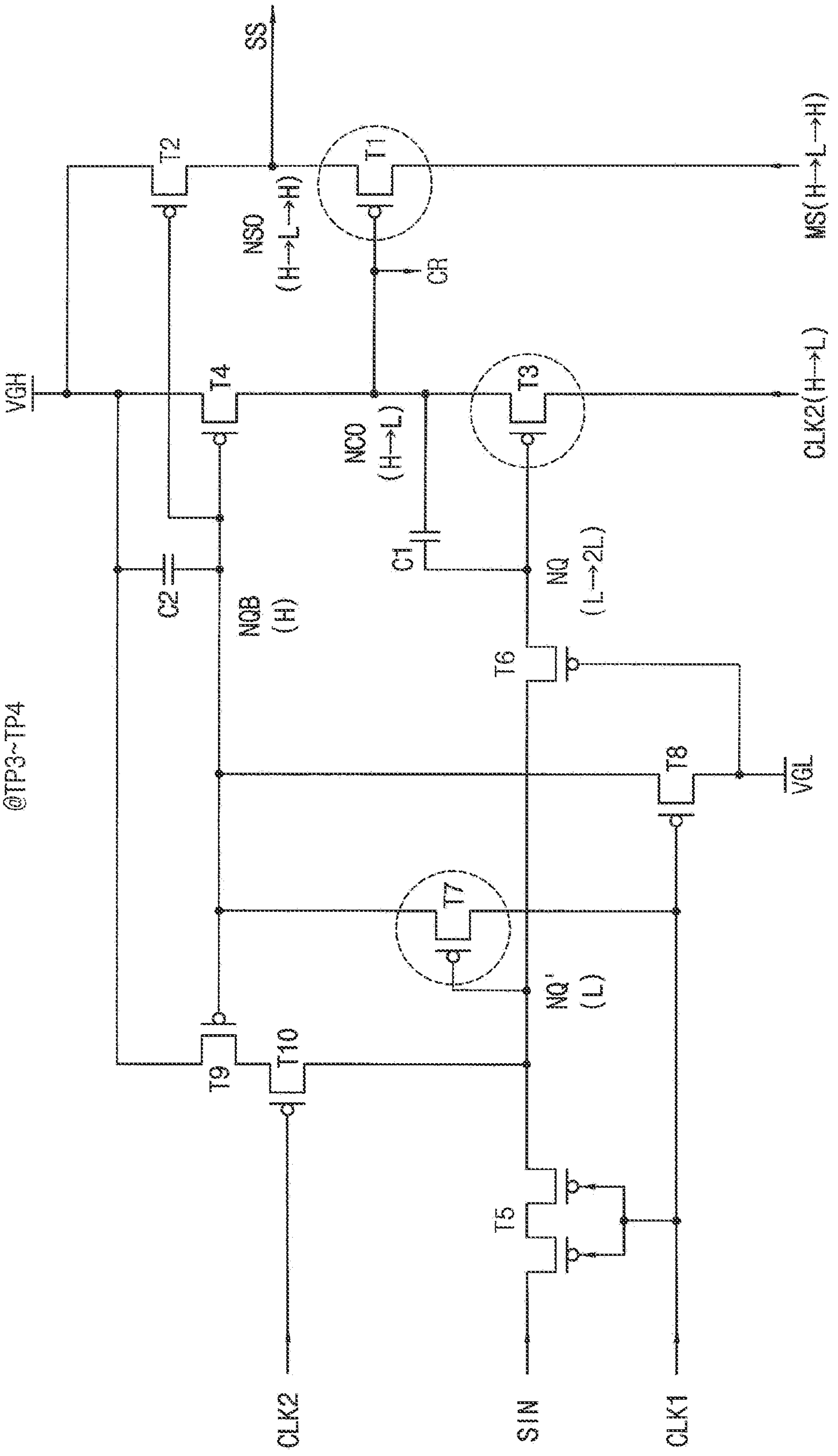

The second clock signal CLK2 may be changed from the high level H to the first low level L at the third time point TP3, and the second clock signal CLK2 having the first low level L may be applied in a period from the third time point TP3 to a fourth time point TP4. In this case, as illustrated in FIG. 5, the third transistor T3 may be turned on in response to the voltage V_NQ of the first node NQ, and the second clock signal CLK2 having the first low level L may be output by the turned-on third transistor T3 as the carry signal CR having the first low level L at a carry output node NCO.

If the second clock signal CLK2 having the first low level L is applied to the carry output node NCO through the turned-on third transistor T3, a voltage of the carry output node NCO, or a voltage of a first electrode of a first capacitor C1 may be changed from the high level H to the first low level L. If the voltage of the first electrode of the first capacitor C1 is changed from the high level H to the first low level L, a voltage of a second electrode of the first capacitor C1, or the voltage V_NQ of the first node NQ may be changed from the first low level L to the second low level 2L lower than the first low level L.

In some example embodiments, a voltage level difference between the first low level L and the second low level 2L may correspond to, but not limited to, a voltage level difference between the high level H and the first low level L. Here, an operation that changes the voltage V_NQ of the first node NQ from the first low level L to the second low level 2L may be referred to as a bootstrap operation, and the first capacitor C1 may be referred to as a bootstrap capacitor.

In a case where the stage 100 does not include the sixth transistor T6, or in a case where the first node NQ and the third node NQ' are the same node, if the voltage V_NQ of the first node NQ is changed from the first low level L to the second low level 2L, the voltage V_NQ of the first node NQ having a high absolute value may be applied to transistors T5, T7, and T10 directly coupled to the third node NQ'. For example, because a voltage having the high level H may be applied to first terminals of the transistors T5, T7, and T10, and a voltage having the second low level 2L may be applied to second terminals of the transistors T5, T7, and T10, a high voltage stress may be applied to the transistors T5, T7, and T10. However, in the stage 100 of the scan driver according to some example embodiments, although the voltage V_NQ of the first node NQ has the second low level 2L, the low gate voltage VGL having the first low level L higher than the second low level 2L may be applied to the gate of the sixth transistor T6, and thus the voltage V_NQ of the first node NQ may not be transferred to the third node NQ'. Accordingly, the voltage stress applied to the transistors T5, T7, and T10 directly coupled to the third node NQ' may be reduced. Thus, the sixth transistor T6 may be referred to as a stress relaxing (or relieving) transistor.

While the carry signal CR is output, by the seventh transistor T7 having a gate receiving the voltage V_NQ' of the third node NQ', the voltage V_NQB of the second node NQB may be held or maintained as the high level H. Thus, while the carry signal CR is output, the second and fourth transistors T2 and T4 may not be turned on based on the voltage V_NQB of the second node NQB having the high level H.

Further, while the carry signal CR is output, or in the first active period AP1 of the carry signal CR, the first transistor T1 may be turned on in response to the carry signal CR output at the carry output node NCO, and the turned-on first transistor T1 may output the masking signal MS as a scan signal SS provided to a pixel row corresponding to the stage 100 at a scan output node NSO. For example, in the first active period AP of the carry signal CR, the masking signal MS may have the on level 210 (e.g., the first low level L) or the off level 220 (e.g., the high level H) according to the driving frequency of the panel region including the pixel row, and the turned-on first transistor T1 may output the scan signal SS having the on level 230 when the masking signal MS has the on level 210, and may output the scan signal SS having the off level 240 when the masking signal MS has the off level 220.

In some example embodiments, as illustrated in FIG. 2, a second active period AP2 of the masking signal MS in which the masking signal MS has the on level may at least partially overlap the first active period AP1 of the carry signal CR. Thus, in the first active period AP1 of the carry signal CR, the masking signal MS having the on level 210 may be output as the scan signal SS. Further, in some example embodiments, as illustrated in FIG. 2, an end time point of the second active period AP2 of the masking signal MS, or a rising edge RE2 of the masking signal MS may lead an end time point of the first active period AP1 of the carry signal CR, or a rising edge RE1 of the carry signal CR. Thus, although the masking signal MS has the on level 210 in the first active period AP1 of the carry signal CR, the masking signal MS may be changed from the on level 210 (e.g., the first low level L) to the off level 220 (e.g., the high level H) before the first active period AP1 of the carry signal CR ends. Accordingly, before the first active period AP1 of the carry signal CR ends, the turned-on first transistor T1 may transfer the masking signal MS having the high level H to the scan output node NSO, and a voltage of the scan output node NSO may be changed to the high level H.

If the second clock signal CLK2 is changed to the high level H at the fourth time point TP4, the carry signal CR at the carry output node NCO may be changed to the high level H. If the voltage of the carry output node NCO, or the voltage of the first electrode of the first capacitor C1 is changed from the first low level L to the high level H, the voltage of the second electrode of the first capacitor C1, or the voltage V_NQ of the first node NQ may be changed from the second low level 2L to the first low level L.

Figure 6:
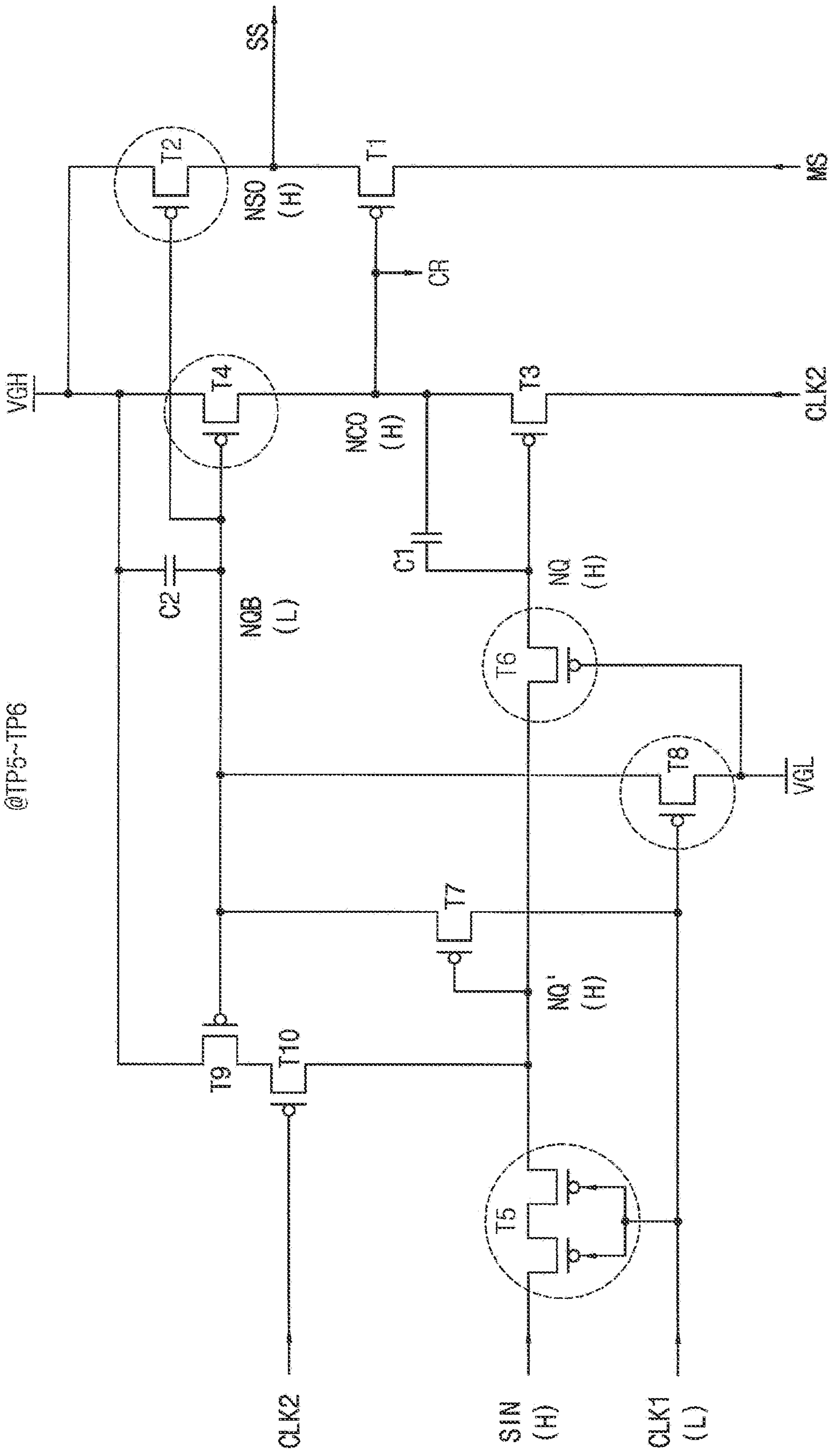

The first clock signal CLK1 may be changed from the high level H to the first low level L at a fifth time point TP5, and the first clock signal CLK1 having the first low level L may be applied in a period from the fifth time point TP5 to a sixth time point TP6. In this case, as illustrated in FIG. 6, the fifth transistor T5 and the eighth transistor T8 may be turned on in response to the first clock signal CLK1 having the first low level L, and the sixth transistor T6 may be turned on in response to the low gate voltage VGL having the first low level L.

The voltage V_NQ' of the third node NQ' may be changed by the turned-on fifth transistor T5 from the first low level L to the high level H, and the voltage V_NQ of the first node NQ may be changed by the turned-on sixth transistor T6 from the first low level L to the high level H. The voltage V_NQB of the second node NQB may be changed by the turned-on eighth transistor T8 from the high level H to the first low level L. Further, the eighth transistor T8 may be turned on each time the first clock signal CLK1 has the first low level L, and thus the low gate voltage VGL may be periodically applied to the second node NQB. The second transistor T2 and the fourth transistor T4 may be turned on in response to the voltage V_NQB of the second node NQB having the first low level L. The turned-on second transistor T2 may apply the high gate voltage VGH to the scan output node NSO, and the turned-on fourth transistor T4 may apply the high gate voltage VGH to the carry output node NCO.

Figure 7:
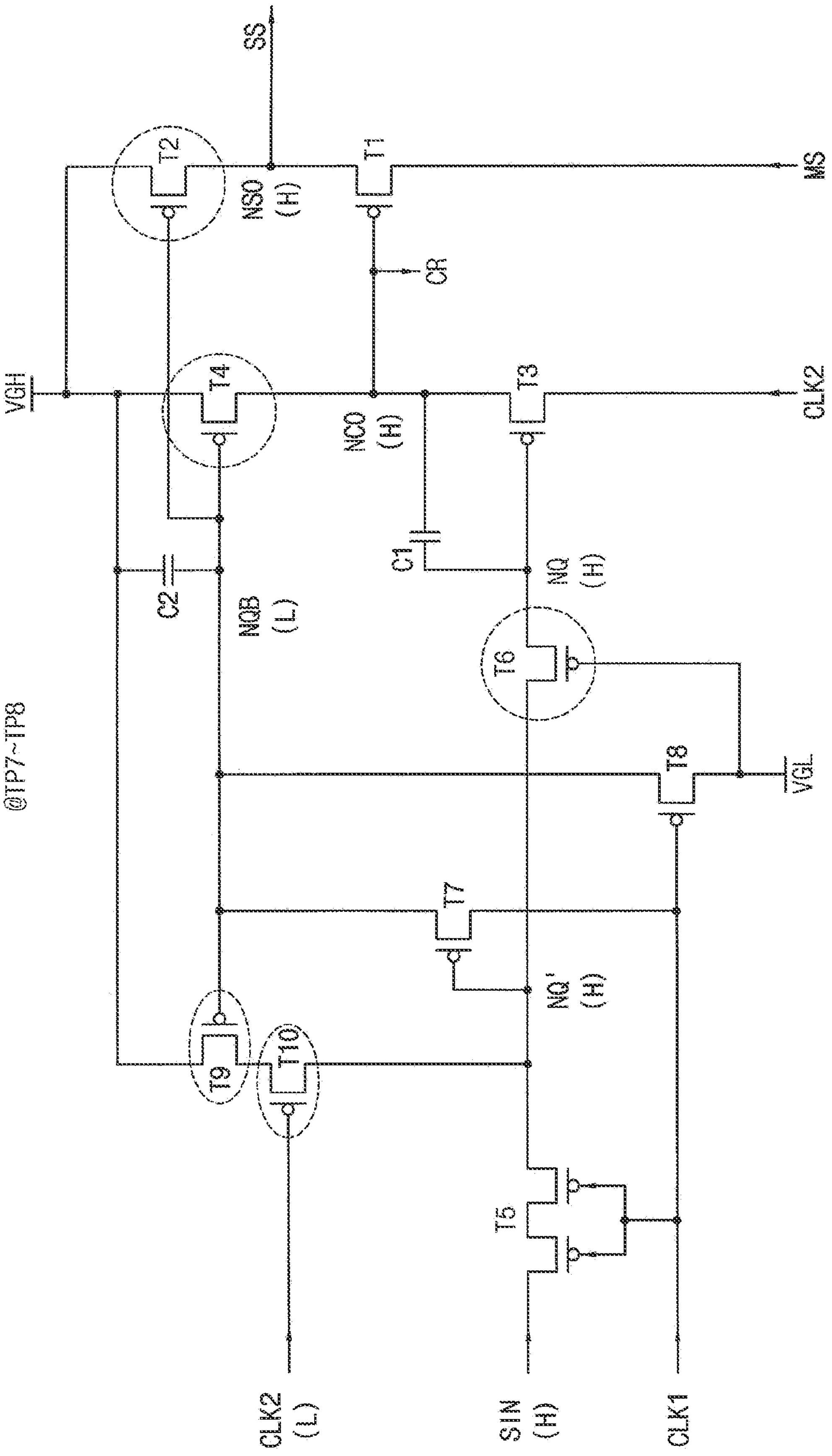

The second clock signal CLK2 may be changed from the high level H to the first low level L at a seventh time point TP7, and the second clock signal CLK2 having the first low level L may be applied in a period from the seventh time point TP7 to an eighth time point TP8. In this case, as illustrated in FIG. 7, the ninth transistor T9 may be turned on in response to the voltage V_NQB of the second node NQB having the first low level L, the tenth transistor T10 may be turned on in response to the second clock signal CLK2 having the first low level L, and the sixth transistor T6 may be turned on in response to the low gate voltage VGL having the first low level L.

The turned-on ninth and tenth transistors T9 and T10 may transfer the high gate voltage VGH to the third node NQ', and thus the voltage V_NQ' of the third node NQ' may be stabilized to the high level H. Further, the voltage V_NQ of the first node NQ may be stabilized by the turned-on sixth transistor T6 to the high level H. The tenth transistor T10 may be turned on each time the second clock signal CLK2 has the first low level L, and thus the high gate voltage VGH may be periodically applied to the first and third nodes NQ and NQ'.

As described above, in the scan driver according to some example embodiments, each stage 100 may generate the carry signal CR, and may output the masking signal MS as the scan signal SS in response to the carry signal CR. Accordingly, each stage 100 may selectively output the scan signal SS having the on level 230.

Figure 8:
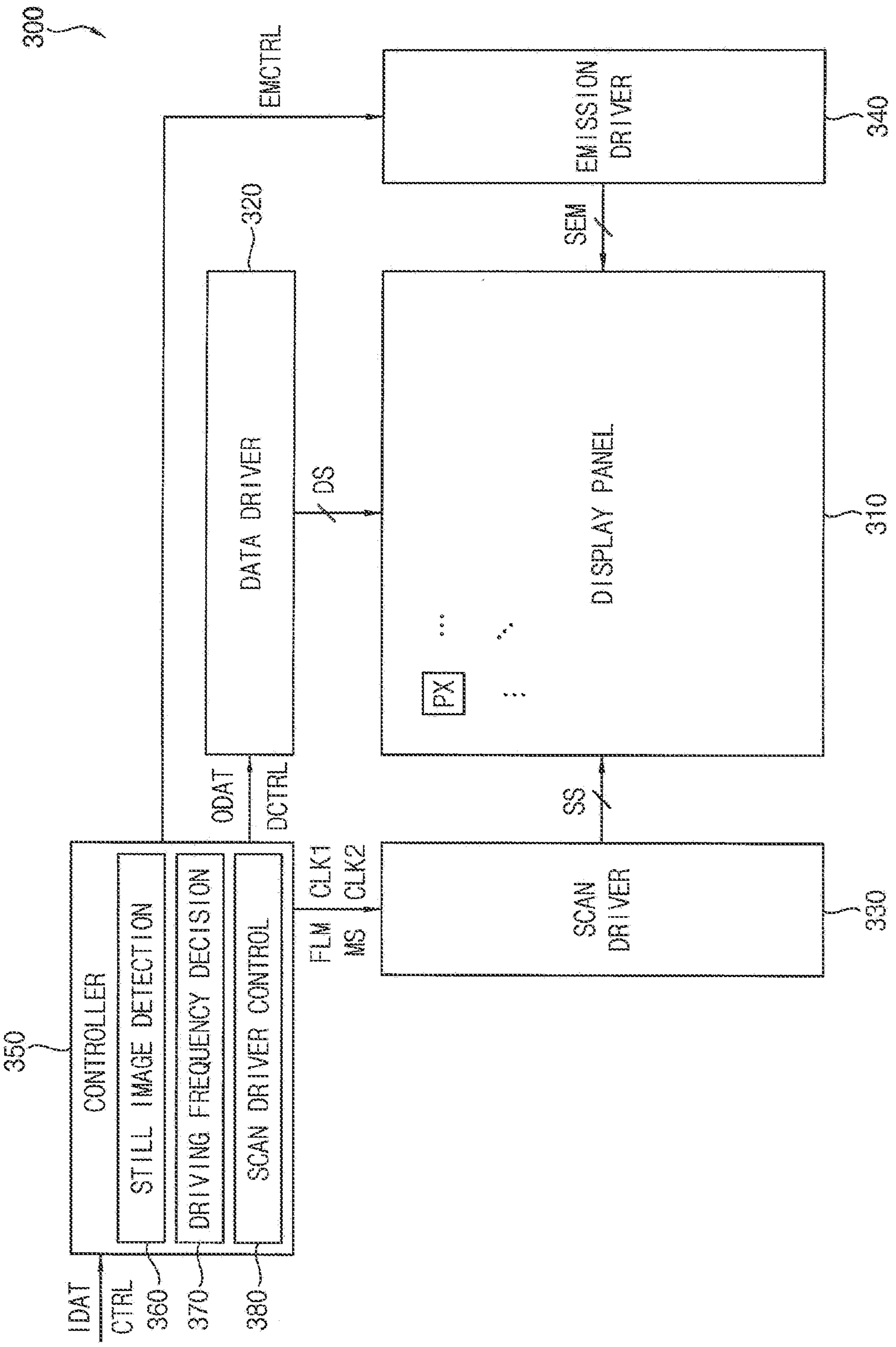
FIG. 8 is a block diagram illustrating a display device including a scan driver according to some example embodiments.
Figure 9:
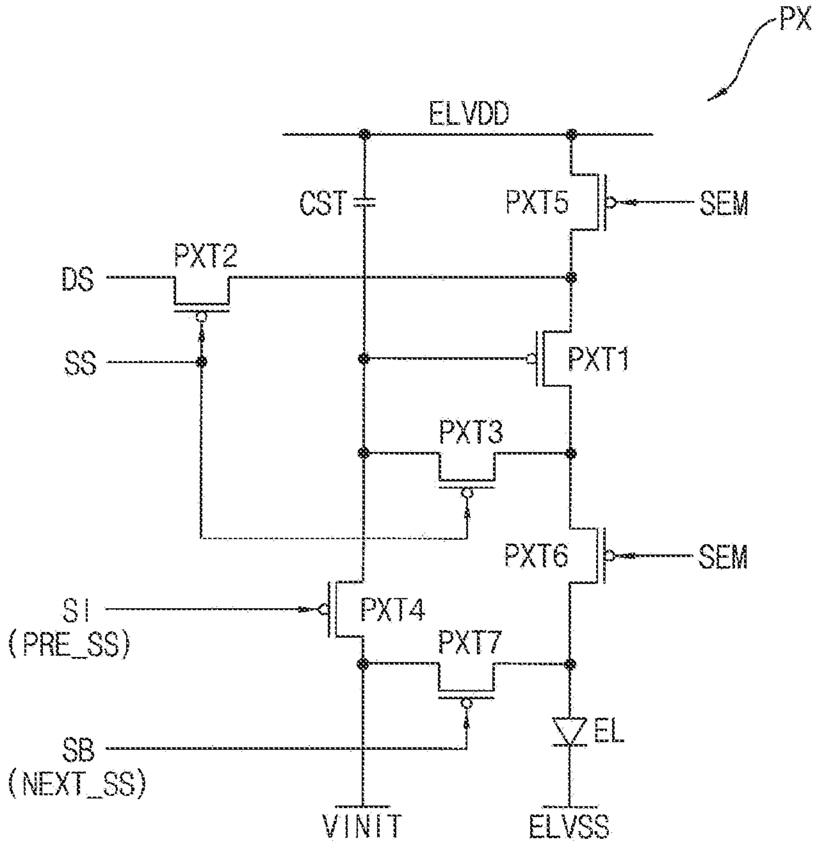
FIG. 9 is a circuit diagram illustrating an example of a pixel included in a display device according to some example embodiments.
Figure 10:
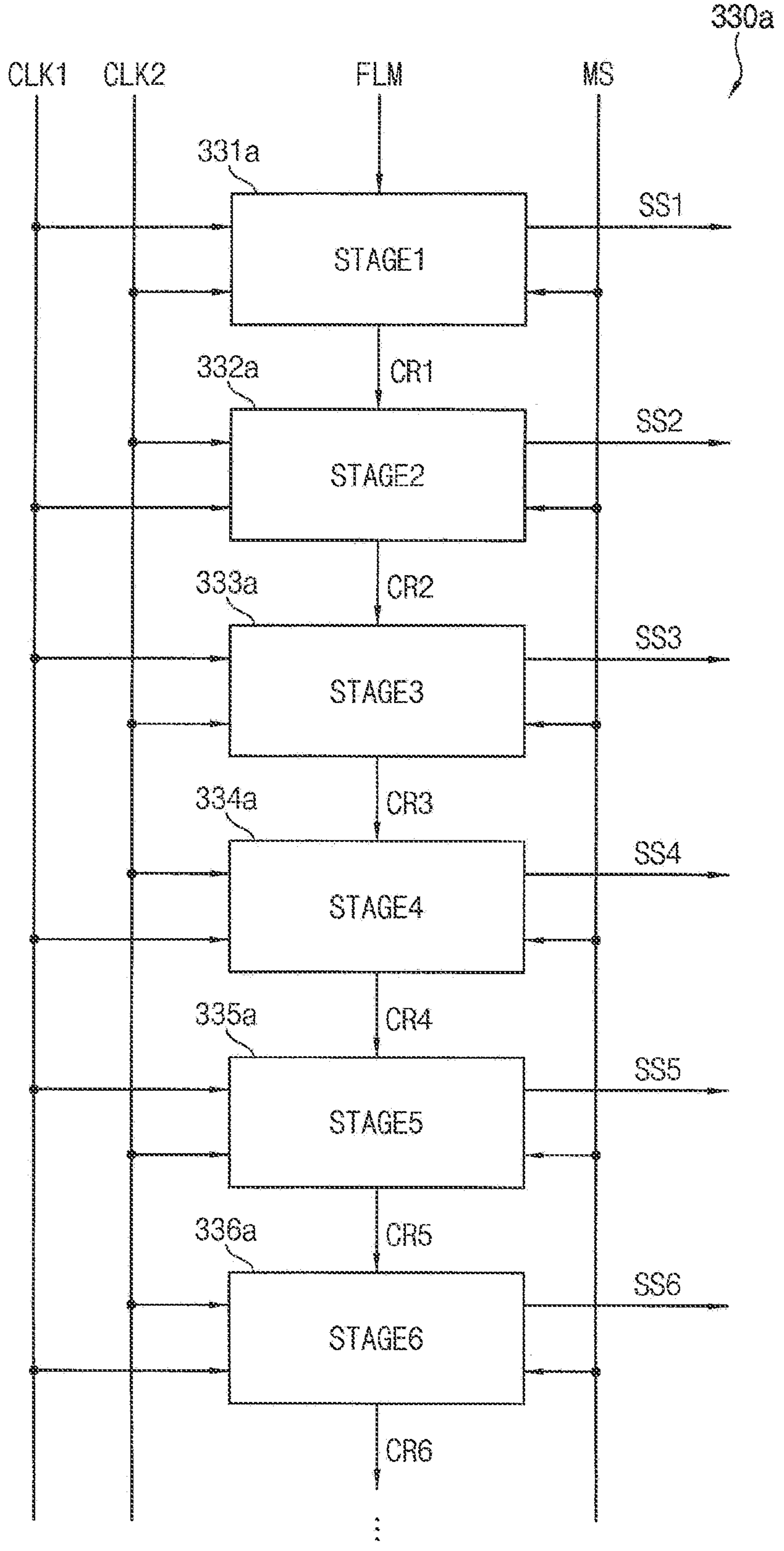
FIG. 10 is a block diagram illustrating an example of a scan driver included in a display device according to some example embodiments.
Figure 11:
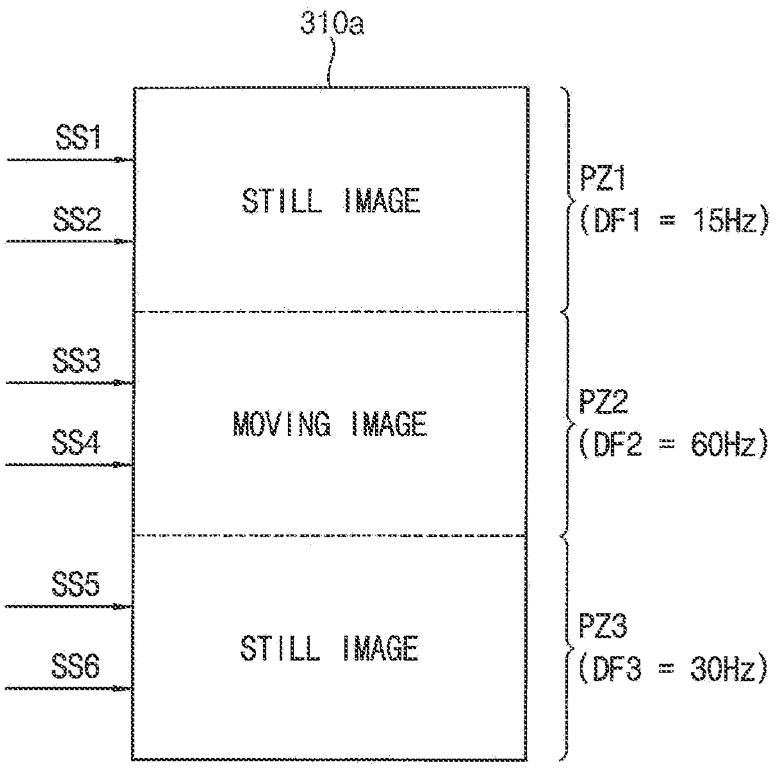
FIG. 11 is a diagram illustrating an example of a display panel including a plurality of panel regions driven at different driving frequencies in a display device according to some example embodiments.
Figure 12:
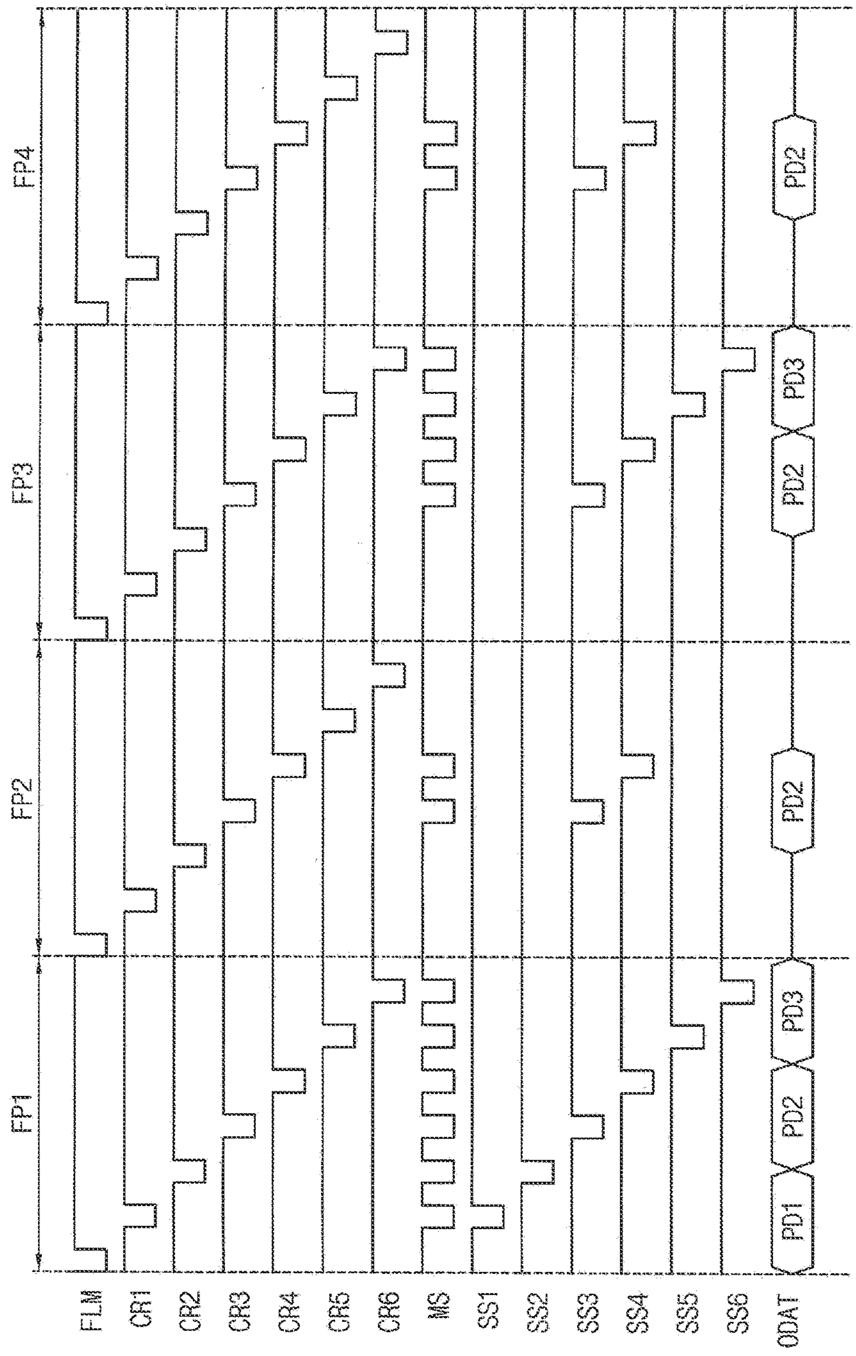
FIG. 12 is a timing diagram for describing an example of an operation of a scan driver that provides scan signals to a display panel of FIG. 11.
Figure 13:
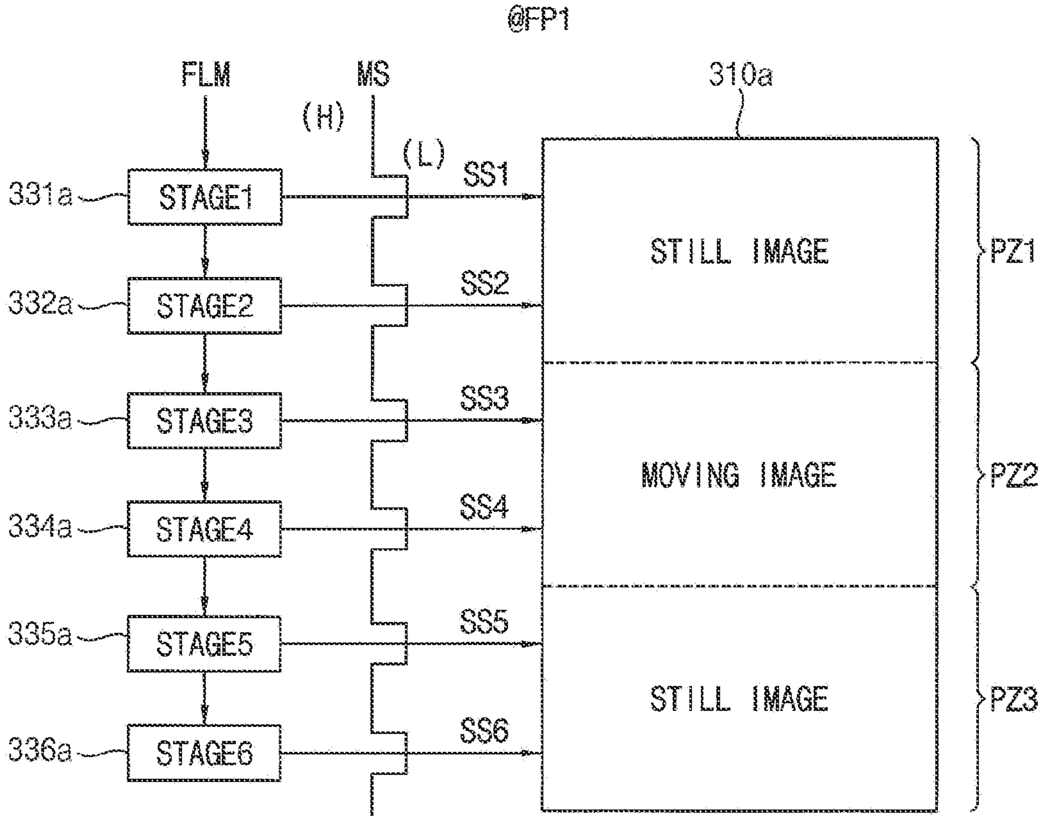
FIG. 13 is a diagram for describing an example of an operation of a scan driver that provides scan signals to a display panel of FIG. 11 in a first frame period.
Figure 14:
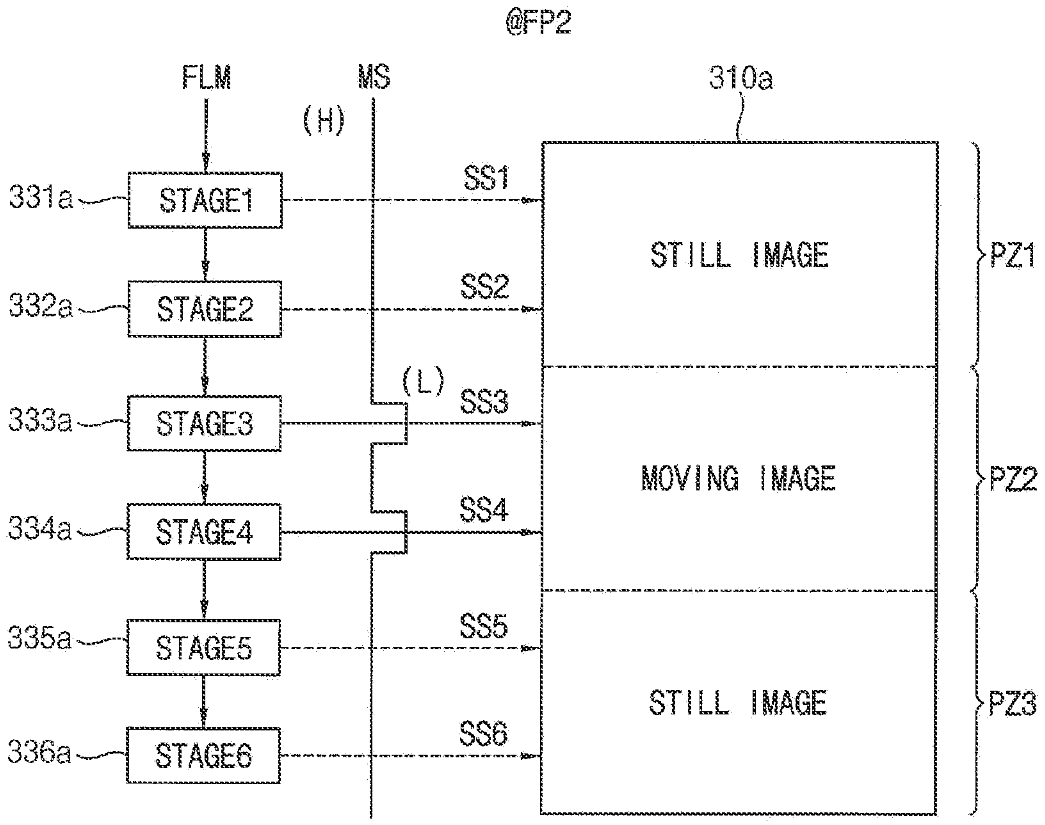
FIG. 14 is a diagram for describing an example of an operation of a scan driver that provides scan signals to a display panel of FIG. 11 in a second frame period.
Figure 15:
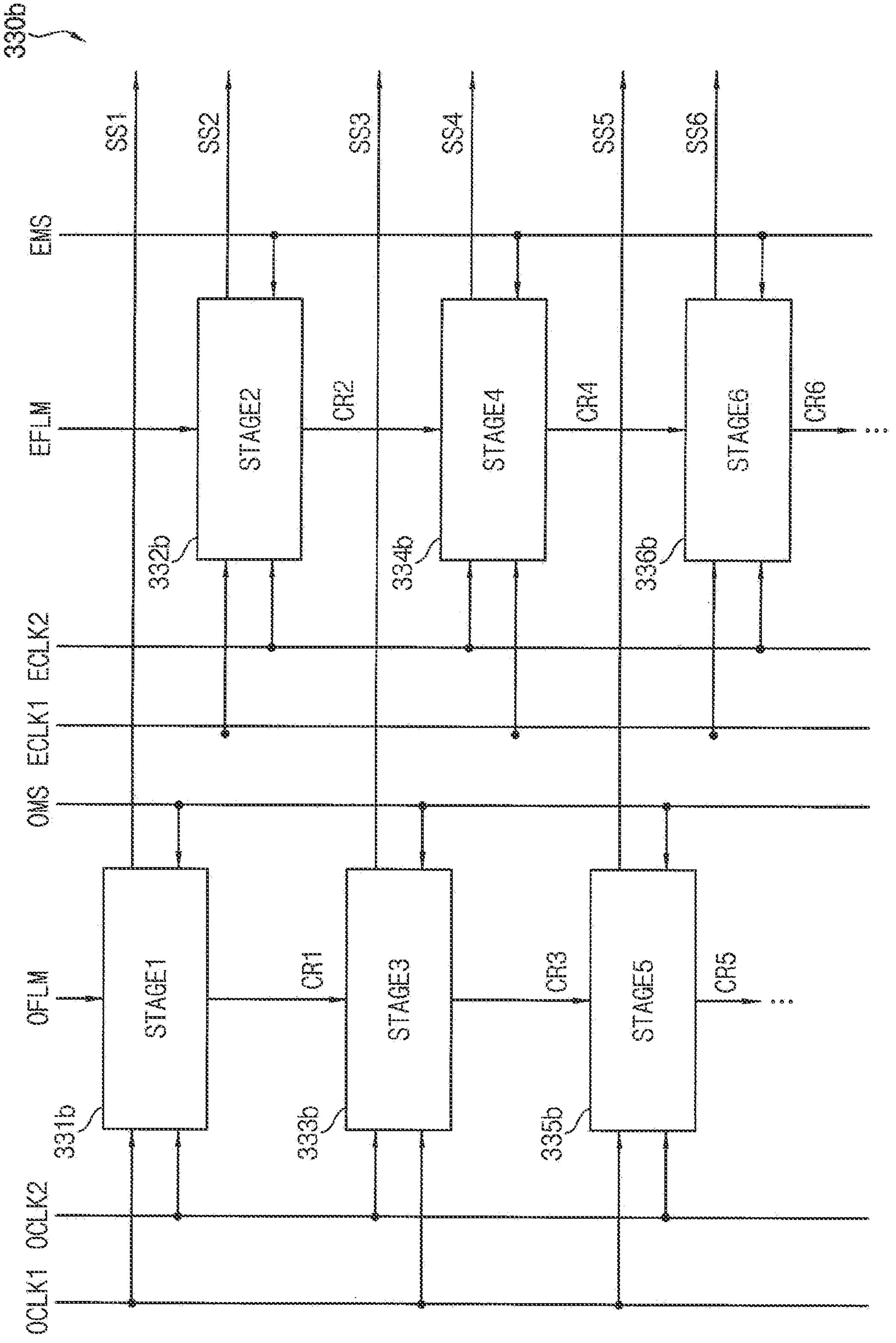
FIG. 15 is a block diagram illustrating another example of a scan driver included in a display device according to some example embodiments.

FIG. 8 is a block diagram illustrating a display device including a scan driver according to some example embodiments, FIG. 9 is a circuit diagram illustrating an example of a pixel included in a display device according to some example embodiments, FIG. 10 is a block diagram illustrating an example of a scan driver included in a display device according to some example embodiments, FIG. 11 is a diagram illustrating an example of a display panel including a plurality of panel regions driven at different driving frequencies in a display device according to some example embodiments, FIG. 12 is a timing diagram for describing an example of an operation of a scan driver that provides scan signals to a display panel of FIG. 11, FIG. 13 is a diagram for describing an example of an operation of a scan driver that provides scan signals to a display panel of FIG. 11 in a first frame period, FIG. 14 is a diagram for describing an example of an operation of a scan driver that provides scan signals to a display panel of FIG. 11 in a second frame period, and FIG. 15 is a block diagram illustrating another example of a scan driver included in a display device according to some example embodiments.

Referring to FIG. 8, a display device 300 according to some example embodiments may include a display panel 310 that includes a plurality of pixel rows, a data driver 320 that provides data signals DS to each of the plurality of pixel rows, a scan driver 330 that provides a plurality of scan signals SS to the plurality of pixel rows, respectively, and a controller 350 that controls the data driver 320 and the scan driver 330. In some example embodiments, the display device 300 may further include an emission driver 340 that provides emission signals SEM to the plurality of pixel rows.

The display panel 310 may include a plurality of scan lines, a plurality of data lines, and the plurality of pixel rows respectively coupled to the plurality of scan lines. Here, each pixel row may mean one row of pixels PX connected to a single scan line. In some example embodiments, each pixel PX may include at least one capacitor, at least two transistors and an organic light emitting diode (OLED), and the display panel 310 may be an OLED display panel.

For example, as illustrated in FIG. 9, each pixel PX may include a driving transistor PXT1 that generates a driving current, a switching transistor PXT2 that transfers the data signal DS from the data driver 320 to a source electrode of the driving transistor PXT1 in response to the scan signal SS from the scan driver 330, a compensating transistor PXT3 that diode-connects the driving transistor PXT1 in response to the scan signal SS from the scan driver 330, a storage capacitor CST that stores the data signal DS transferred through the switching transistor PXT2 and the diode-connected driving transistor PXT1, a first initializing transistor PXT4 that provides an initialization voltage VINIT to the storage capacitor CST and a gate of the driving transistor PXT1 in response to an initialization signal SI (or the scan signal PRE_SS for a previous pixel row) from the scan driver 330, a first emission transistor PXT5 that connects a line of a first power supply voltage ELVDD to the source of the driving transistor PXT1 in response to the emission signal SEM from the emission driver 340, a second emission transistor PXT6 that connects a drain of the driving transistor PXT1 to an organic light emitting diode EL in response to the emission signal SEM from the emission driver 340, a second initializing transistor PXT7 (or a bypass transistor) that provides the initialization voltage VINIT to the organic light emitting diode EL in response to a bypass signal SB (or the scan signal NEXT_SS for a next pixel row) from the scan driver 330, and the organic light emitting diode EL that emits light based on the driving current from the line of the first power supply voltage ELVDD to a line of a second power supply voltage ELVSS.

In some example embodiments, each pixel PX may include PMOS transistors PXT1 through PXT7 as illustrated in FIG. 9. In other example embodiments, each pixel PX may include NMOS transistors.

In still other example embodiments, each pixel PX may include different types of transistors suitable for low frequency driving capable of reducing power consumption. For example, each pixel PX may include at least one a low-temperature polycrystalline silicon (LTPS) PMOS transistor, and at least one oxide NMOS transistor. For example, the compensating transistor PXT3 and the first initializing transistor PXT4 may be implemented with the NMOS transistors, and other transistors PXT1, PXT2, PXT5, PXT6 and PXT7 may be implemented with the PMOS transistors. Additionally, according to some example embodiments, the pixel circuit of the pixel PX may include fewer or additional transistors, capacitors, and/or other electrical circuit components without departing from the spirit and scope of example embodiments.

In this case, because the transistors PXT3 and PXT4 directly coupled to the storage capacitor CST are implemented with the NMOS transistors, a leakage current from the storage capacitor CST may be reduced, and thus the pixel PX may be suitable for the low frequency driving. In other example embodiments, the display panel 310 may be a liquid crystal display (LCD) panel, or the like.

The data driver 320 may generate the data signals DS based on output image data ODAT and a data control signal DCTRL received from the controller 350, and may provide the data signals DS to each of the plurality of pixel rows through the plurality of data lines. In some example embodiments, the data control signal DCTRL may include, but not limited to, an output data enable signal, a horizontal start signal and a load signal. In some example embodiments, the data driver 320 and the controller 350 may be implemented with a single integrated circuit, and the single integrated circuit may be referred to as a timing controller embedded data driver (TED). In other example embodiments, the data driver 320 and the controller 350 may be implemented with separate integrated circuits.

The scan driver 330 may generate the plurality scan signals SS based on a scan control signal received from the controller 350, and may provide the plurality of scan signals SS to the plurality of pixel rows through the plurality of scan lines, respectively. In some example embodiments, the scan control signal may include, but not limited to, a scan start signal FLM, a first clock signals CLK1, a second clock signal CLK2, and a masking signal MS. In some example embodiments, the scan driver 330 may be integrated or formed in a peripheral portion of the display panel 310. In other example embodiments, the scan driver 330 may be implemented with one or more integrated circuits.

In some example embodiments, as illustrated in FIG. 10, the scan driver 330 may include a plurality of stages 331*a*, 332*a*, 333*a*, 334*a*, 335*a*, 336*a*, . . . that sequentially generate a plurality of carry signals CR1, CR2, CR3, CR4, CR5, CR6, . . . , and selectively generates the respective scan signals SS1, SS2, SS3, SS4, SS5, SS6, . . . according to the masking signal MS. In some example embodiments, each stage 331*a*, 332*a*, 333*a*, 334*a*, 335*a*, 336*a*, . . . may have a configuration the same as or similar to a configuration of a stage 100 of FIG. 1.

The plurality of stages 331*a*, 332*a*, 333*a*, 334*a*, 335*a*, 336*a*, . . . may receive the scan start signal FLM, may receive the first and second clock signals CLK1 and CLK2 having different phases (e.g., opposite phases), and may further receive the masking signal MS having an on level or an off level in active periods of the respective carry signals CR1, CR2, CR3, CR4, CR5, CR6, . . . . A first stage 331*a* of the plurality of stages 331*a*, 332*a*, 333*a*, 334*a*, 335*a*, 336*a*, . . . may receive the scan start signal FLM as an input signal, and the remaining stages (e.g., 332*a*) of the plurality of stages 331*a*, 332*a*, 333*a*, 334*a*, 335*a*, 336*a*, . . . may receive, as the input signals, the carry signal (e.g., CR1) from the previous stage (e.g., 331*a*).

In some example embodiments, odd-numbered stages 331*a*, 333*a*, 335*a*, . . . of the plurality of stages 331*a*, 332*a*, 333*a*, 334*a*, 335*a*, 336*a*, . . . may receive the input signals in response to the first clock signal CLK1, and may generate the carry signals CR1, CR3, CR5, . . . in response to the second clock signal CLK2. Further, even-numbered stages 332*a*, 334*a*, 336*a*, . . . of the plurality of stages 331*a*, 332*a*, 333*a*, 334*a*, 335*a*, 336*a*, . . . may receive the input signals in response to the second clock signal CLK2, and may generate the carry signals CR2, CR4, CR6, . . . in response to the first clock signal CLK1. The respective 331*a*, 332*a*, 333*a*, 334*a*, 335*a*, 336*a*, . . . may output the masking signal MS as the respective scan signals SS1, SS2, SS3, SS4, SS5, SS6, . . . in active periods of the respective carry signals CR1, CR2, CR3, CR4, CR5, CR6, . . . .

Thus, for example, while a first stage 331*a* outputs a first carry signal CR1, the first stage 331*a* may output a first scan signal SS1 in a case where the masking signal MS has the on level, and may not output the first scan signal SS1 in a case where the masking signal MS has the off level. Thereafter, while a second stage 332*a* outputs a second carry signal CR2, the second stage 332*a* may output a second scan signal SS2 in a case where the masking signal MS has the on level, and may not output the second scan signal SS2 in a case where the masking signal MS has the off level.

The emission driver 340 may generate the emission signals SEM based on an emission control signal EMCTRL received from the controller 350, and may provide the emission signals SEM to the plurality of pixel rows through a plurality of emission lines. In some example embodiments, the emission signals SEM may be sequentially provided to the plurality of pixel rows. In other example embodiments, the emission signals SEM may be a global signal that is substantially simultaneously provided to the plurality of pixel rows. In some example embodiments, the emission driver 340 may be integrated or formed in the peripheral portion of the display panel 310. In other example embodiments, the emission driver 340 may be implemented with one or more integrated circuits.

The controller (e.g., a timing controller (TCON)) 350 may receive input image data IDAT and a control signal CTRL from an external host (e.g., a graphic processing unit (GPU) or a graphic card). In some example embodiments, the control signal CTRL may include, but not limited to, a vertical synchronization signal, a horizontal synchronization signal, an input data enable signal, a master clock signal, etc. The controller 350 may generate the output image data ODAT, the data control signal DCTRL, the scan control signal and the emission control signal EMCTRL based on the input image data IDAT and the control signal CTRL.

The controller 350 may control an operation of the data driver 320 by providing the output image data ODAT and the data control signal DCTRL to the data driver 320, may control an operation of the scan driver 330 by providing the scan control signal to the scan driver 330, and may control an operation of the emission driver 340 by providing the emission control signal EMCTRL to the emission driver 340.

The display device 300 according to some example embodiments may perform multi-frequency driving (MFD) that drives a plurality of panel regions of the display panel 310 at a plurality of driving frequencies (that may be different from each other). To perform this MFD, as illustrated in FIG. 8, the controller 350 may include a still image detection block (or still image detector or still image detection circuit) 360, a driving frequency decision block (or driving frequency decider or driving frequency determiner or driving frequency decision circuit) 370 and a scan driver control block (or scan driver controller or scan driver control circuit) 380.

The still image detection block 360 may divide the input image data IDAT into a plurality of panel region data for a plurality of panel regions each including at least one of the plurality of pixel rows, and may determine whether each of the plurality of panel region data represents a still image. In some example embodiments, each panel region may include only one pixel row, and the still image detection block 360 may divide the input image data IDAT into the plurality of panel region data each for one pixel row, and may determine whether each panel region data for one pixel row represents the still image.

In other example embodiments, each panel region may include two or more pixel rows, and the still image detection block 360 may divide the input image data IDAT into the plurality of panel region data each for two or more pixel rows, and may determine whether each panel region data for two or more pixel rows represents the still image.

For example, as illustrated in FIG. 11, the still image detection block 360 may divide the input image data IDAT for the display panel 310*a* into first panel region data for a first panel region PZ1 including first and second pixel rows receiving first and second scan signals SS1 and SS2, second panel region data for a second panel region PZ2 including third and fourth pixel rows receiving third and fourth scan signals SS3 and SS4, and third panel region data for a third panel region PZ3 including fifth and sixth pixel rows receiving fifth and sixth scan signals SS5 and SS6. Although FIG. 11 illustrates an example of the display panel 310*a* including the first through sixth pixel rows receiving the first through sixth scan signals SS1 through SS6, the number of the pixel rows of the display panel 310 is not limited to the example of FIG. 11. Further, although FIG. 11 illustrates an example where the display panel 310*a* is divided into the first through third panel regions PZ1, PZ2 and PZ3, the number of the panel regions PZ1, PZ2 and PZ3 is not limited to the example of FIG. 11.

In some example embodiments, with respect to each panel region data, the still image detection block 360 may determine whether or not the panel region data represents the still or static image by comparing the panel region data in a previous frame period and the panel region data in a current frame period. For example, the still image detection block 360 may determine that the panel region data represents the still image in a case where the panel region data in the current frame period is the same as the panel region data in the previous frame period, and may determine that the panel region data does not represent the still image or represents a moving image in a case where the panel region data in the current frame period is different from the panel region data in the previous frame period.

In other example embodiments, with respect to each panel region data, the still image detection block 360 may determine whether the panel region data represents the still image by comparing a previous representative value (e.g., an average value or a checksum) of the panel region data in the previous frame period and a current representative value of the panel region data in the current frame period. For example, as illustrated in FIG. 11, the still image detection block 360 may determine that the first panel region data for the first panel region PZ1 represents the still image in a case where the current representative value of the first panel region data is the same as the previous representative value of the first panel region data, may determine that the second panel region data for the second panel region PZ2 represents the moving image in a case where the current representative value of the second panel region data is different from the previous representative value of the second panel region data, and may determine that the third panel region data for the third panel region PZ3 represents the still image in a case where the current representative value of the third panel region data is the same as the previous representative value of the third panel region data.

The driving frequency decision block 370 may decide (or set or determine) a plurality of driving frequencies for the plurality of panel regions according to whether each of the plurality of panel region data represents the still image. In some example embodiments, in a case where each panel region data represents the moving image, the driving frequency decision block 370 may decide (or set or determine) the driving frequency for the panel region corresponding to the panel region data as a normal driving frequency. Here, the normal driving frequency may be a driving frequency in normal driving of the display device 300.

For example, the normal driving frequency may be the same as an input frame frequency (e.g., about 60 Hz or about 120 Hz) of the input image data IDAT. Further, in a case where each panel region data represents the still image, the driving frequency decision block 370 may decide (or set or determine) the driving frequency for the panel region corresponding to the panel region data as a low driving frequency lower than the normal driving frequency. Here, the low driving frequency may be any frequency lower than the normal driving frequency.

In some example embodiments, in a case where each panel region data represents the still image, the driving frequency decision block 370 may determine a flicker value corresponding to a gray level (or luminance) of the panel region data by using a flicker lookup table, and may decide (or set or determine) the driving frequency for the panel region corresponding to the panel region data based on the flicker value. For example, the flicker lookup table may store flicker values respectively corresponding to image data gray levels (e.g., 256 gray levels from 0-gray level to 255-gray level). Here, the flicker value may represent a level of a flicker perceived by a user.

According to some example embodiments, determining the flicker value and the driving frequency may be performed on a pixel-by-pixel basis, a segment-by-segment basis, or a panel region-by-panel region basis. For example, each panel region data may be divided into a plurality of segment data for a plurality of segments, flicker values for the respective segments may be determined by using the flicker lookup table, segment driving frequencies for the respective segments may be determined, and the driving frequency for the panel region may be determined as the maximum one of the segment driving frequencies.

For example, as illustrated in FIG. 11, in a case where the second panel region data for the second panel region PZ2 represents a moving image, the driving frequency decision block 370 may decide (or set or determine) a second driving frequency DF2 for the second panel region PZ2 as the normal driving frequency, for example about 60 Hz. Further, in a case where each of the first and third panel region data for the first and third panel regions PZ1 and PZ3 represents a still image, the driving frequency decision block 370 may decide (or set or determine) first and third driving frequencies DF1 and DF3 for the first and third panel regions PZ1 and PZ3 as the low driving frequencies lower than the normal driving frequency. For example, the driving frequency decision block 370 may determine a flicker value according to a gray level (or luminance) of the first panel region data, and may decide (or set or determine) the first driving frequency DF1 for the first panel region PZ1 as about 15 Hz lower than the normal driving frequency according to the flicker value. Further, the driving frequency decision block 370 may determine a flicker value according to a gray level (or luminance) of the third panel region data, and may decide (or set or determine) the third driving frequency DF3 for the third panel region PZ3 as about 30 Hz lower than the normal driving frequency according to the flicker value.

The scan driver control block 380 may generate the masking signal MS based on the plurality of driving frequencies for the plurality of panel regions. In some example embodiments, to output a corresponding scan signal SS to a pixel row included in a panel region driven at the normal driving frequency in all of frame periods, the scan driver control block 380 may generate the masking signal MS having an on level in all of active periods of the carry signal CR generated by a stage coupled to the pixel row.

Further, to output a corresponding scan signal SS to a pixel row included in a panel region driven at the low driving frequency in a portion of the frame periods, the scan driver control block 380 may generate the masking signal MS having the on level in a portion of active periods of the carry signal CR generated by a stage coupled to the pixel row, and having an off level in a remaining portion of the active periods of the carry signal CR generated by the stage coupled to the pixel row.

For example, as illustrated in FIGS. 10 through 12, the plurality of stages 331*a* through 336*a* may sequentially generate the plurality of carry signals CR1 through CR6 in each frame period FP1 through FP4. The scan driver control block 380 may generate the masking signal MS having the on level or the off level in the active periods of the plurality of carry signals CR1 through CR6 in the plurality of frame periods FP1 through FP4 according to the plurality of driving frequencies DF1, DF2 and DF3 for the plurality of panel regions DF1, DF2 and DF3. The plurality of stages 331*a* through 336*a* may selectively output the plurality of scan signals SS1 through SS6 according to the masking signal MS.

In an example, as illustrated in FIG. 11, in a case where the second driving frequency DF2 for the second panel region PZ2 is decided (or set or determines) as the normal driving frequency, for example about 60 Hz, the scan driver control block 380 may generate the masking signal MS having the on level in all of active periods of third and fourth carry signals CR3 and CR4 in first through fourth frame periods FP1, FP2, FP3 and FP4, and third and fourth stages 333*a* and 334*a* may output third and fourth scan signals SS3 and SS4 in all of the first through fourth frame periods FP1, FP2, FP3 and FP4 in response to the masking signal MS.

Further, the controller 350 may provide the data driver 320 with the output image data ODAT including the second panel region data PD2 in all of the first through fourth frame periods FP1, FP2, FP3 and FP4, and the data driver 320 may provide the data signals DS corresponding to the second panel region data PD2 to the second panel region PZ2 in of the first through fourth frame periods FP1, FP2, FP3 and FP4. Accordingly, the second panel region PZ2 may be driven at the normal driving frequency, for example about 60 Hz.

Further, in a case where the first driving frequency DF1 for the first panel region PZ1 is decided (or set) as the low driving frequency, for example about 15 Hz, the scan driver control block 380 may generate the masking signal MS having the on level in active periods of first and second carry signals CR1 and CR2 in the first frame period FP1, and having the off level in the active periods of the first and second carry signals CR1 and CR2 in the second through fourth frame periods FP2, FP3 and FP4.

In response to this masking signal MS, first and second stages 331*a* and 332*a* may output first and second scan signals SS1 and SS2 in the first frame period FP1, and may not output the first and second scan signals SS1 and SS2 in the second through fourth frame periods FP2, FP3 and FP4. Further, the controller 350 may provide the data driver 320 with the output image data ODAT including the first panel region data PD1 in the first frame period FP1, and may provide the data driver 320 with the output image data ODAT not including the first panel region data PD1 in the second through fourth frame periods FP2, FP3 and FP4. The data driver 320 may provide the data signals DS corresponding to the first panel region data PD1 to the first panel region PZ1 in the first frame period FP1, and may not provide the data signals DS to the first panel region PZ1 in the second through fourth frame periods FP2, FP3 and FP4. Accordingly, the first panel region PZ1 may be driven at the low driving frequency, for example about 15 Hz.

Further, in a case where the third driving frequency DF3 for the third panel region PZ3 is decided (or set or determined) as the low driving frequency, for example about 30 Hz, the scan driver control block 380 may generate the masking signal MS having the on level in active periods of fifth and sixth carry signals CR5 and CR6 in the first and third frame periods FP1 and FP3, and having the off level in the active periods of the fifth and sixth carry signals CR5 and CR6 in the second and fourth frame periods FP2 and FP4. In response to this masking signal MS, fifth and sixth stages 335*a* and 336*a* may output fifth and sixth scan signals SS5 and SS6 in the first and third frame periods FP1 and FP3, and may not output fifth and sixth scan signals SS5 and SS6 in the second and fourth frame periods FP2 and FP4.

Further, the controller 350 may provide the data driver 320 with the output image data ODAT including the third panel region data PD3 in the first and third frame periods FP1 and FP3, and may provide the data driver 320 with the output image data ODAT not including the third panel region data PD3 in the second and fourth frame periods FP2 and FP4. The data driver 320 may provide the data signals DS corresponding to the third panel region data PD3 to the third panel region PZ3 in the first and third frame periods FP1 and FP3, and may not provide the data signals DS to the third panel region PZ3 in the second and fourth frame periods FP2 and FP4. Accordingly, the third panel region PZ3 may be driven at the low driving frequency, for example about 30 Hz.

As described above, the scan driver control block 380 may generate the masking signal MS such that the scan signals SS3 and SS4 may be provided to the second panel region PZ2 at which the moving image is displayed in all of the plurality of frame periods FP1, FP2, FP3 and FP4, and the scan signals SS1, SS2, SS5 and SS6 may be provided to the first and third panel regions PZ1 and PZ3 at which the still image is displayed in a portion of the plurality of frame periods FP1, FP2, FP3 and FP4. For example, in the first frame period FP1, as illustrated in FIG. 13, the scan driver control block 380 may generate the masking signal MS having the on level L in the active periods of the first through sixth carry signals CR1 through CR6, and the plurality of stages 331*a* through 336*a* may sequentially output the first through sixth scan signals SS1 through SS6 in response to the masking signal MS.

However, in the second frame period FP2, as illustrated in FIG. 14, the scan driver control block 380 may generate the masking signal MS having the on level L in the active periods of the third and fourth carry signals CR3 and CR4, and having the off level H in the active periods of the first, second, fifth and sixth carry signals CR1, CR2, CR5 and CR6. In response to the masking signal MS, the plurality of stages 331*a* through 336*a* may sequentially output the third and fourth scan signals SS3 and SS4, and may not output the first, second, fifth and sixth scan signals SS1, SS2, SS5 and SS6.

In other example embodiments, as illustrated in FIG. 15, the scan driver 330*b* may include odd-numbered stages 331*b*, 333*b*, 335*b*, . . . coupled in series with each other, and even-numbered stages 332*b*, 334*b*, 336*b*, . . . coupled in series with each other. The odd-numbered stages 331*b*, 333*b*, 335*b*, . . . may provide corresponding scan signals SS1, SS3, SS5, . . . of the plurality of scan signals SS1, SS2, SS3, SS4, SS5, SS6, . . . to odd-numbered pixel rows of the display panel 310, and the even-numbered stages 332*b*, 334*b*, 336*b*, . . . may provide corresponding scan signals SS2, SS4, SS6, . . . of the plurality of scan signals SS1, SS2, SS3, SS4, SS5, SS6, . . . to even-numbered pixel rows of the display panel 310. The odd-numbered stages 331*b*, 333*b*, 335*b*, . . . may perform a scan signal based on an odd scan start signal OFLM, a first odd clock signal OCLK1, a second odd clock signal OCLK2 and an odd masking signal OMS, and the even-numbered stages 332*b*, 334*b*, 336*b*, . . . may perform a scan signal based on an even scan start signal EFLM, a first even clock signal ECLK1, a second even clock signal ECLK2 and an even masking signal EMS.

In the display device 300 according to some example embodiments, each stage of the scan driver 330 may output the masking signals MS as the scan signal SS in response to the carry signal CR. Thus, the scan driver 330 may sequentially generate the plurality of carry signals CR1, CR2, CR3, CR4, CR5, CR6, . . . , and may selectively output the respective scan signals SS1, SS2, SS3, SS4, SS5, SS6, according to the masking signal MS in the active periods of the plurality of carry signals CR1, CR2, CR3, CR4, CR5, CR6, . . . . Accordingly, the scan driver 330 of the display device 300 may provide the plurality of scan signals SS1, SS2, SS3, SS4, SS5, SS6, . . . to the plurality of pixel rows of the display panel 310 at different driving frequencies.

Figure 16:
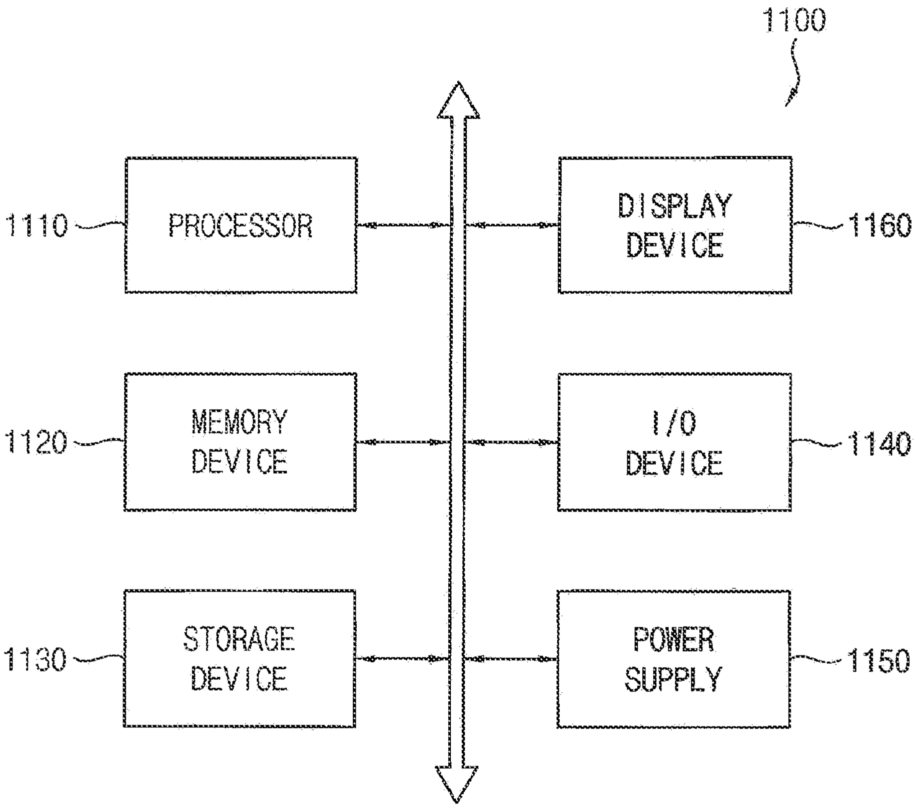
FIG. 16 is an electronic device including a display device according to some example embodiments.

FIG. 16 is an electronic device including a display device according to some example embodiments.

Referring to FIG. 16, an electronic device 1100 may include a processor 1110, a memory device 1120, a storage device 1130, an input/output (I/O) device 1140, a power supply 1150, and a display device 1160. The electronic device 1100 may further include a plurality of ports for communicating a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in some example embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc, and an output device such as a printer, a speaker, etc. The power supply 1150 may supply power for operations of the electronic device 1100. The display device 1160 may be coupled to other components through the buses or other communication links.

In the display device 1160, each stage of a scan driver may include a masking control unit that outputs a masking signal as a scan signal in response to a carry signal. Accordingly, the scan driver may provide a plurality of scan signals to a plurality of pixel rows at different driving frequencies, and the display device 1160 may perform multi-frequency driving.

Aspects of embodiments according to the inventive concept may be applied to any display device 1160, and any electronic device 1100 including the display device 1160. For example, aspects of embodiments according to the inventive concept may be applied to a mobile phone, a smart phone, a wearable electronic device, a tablet computer, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and characteristics of embodiments according to the present inventive concept. Accordingly, all such modifications are intended to be included within the scope of embodiments according to the present inventive concept as defined in the claims and their equivalents. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims and their equivalents.

What is claimed is:

1. A scan driver comprising:

a plurality of stages, each of the plurality of stages comprising:

a first circuit configured to transfer an input signal to a first node in response to a first clock signal;

a second circuit configured to output a second clock signal as a carry signal that is provided as the input signal for a next stage in response to a voltage of the first node; and a masking control circuit configured to receive a masking signal and the carry signal, wherein the masking control circuit includes:

a first transistor configured to output the masking signal as a scan signal in response to the carry signal, wherein the masking signal has an on level or an off level according to a driving frequency of a panel region in a first active period of the carry signal, and wherein the masking control circuit is configured to output the scan signal having the on level based on the masking signal having the on level, and to output the scan signal having the off level based on the masking signal having the off level.

2. The scan driver of claim 1, wherein a second active period of the masking signal in which the masking signal has the on level at least partially overlaps the first active period of the carry signal.

3. The scan driver of claim 2, wherein an end time point of the second active period of the masking signal leads an end time point of the first active period of the carry signal.

4. The scan driver of claim 1, wherein the first transistor includes a gate configured to receive the carry signal, a first terminal coupled to a scan output node at which the scan signal is output, and a second terminal configured to receive the masking signal, and wherein the masking control circuit further includes:

a second transistor including a gate coupled to a second node, a first terminal configured to receive a gate off voltage, and a second terminal coupled to the scan output node.

5. The scan driver of claim 1, wherein the second circuit includes:

a third transistor including a gate coupled to the first node, a first terminal coupled to a carry output node at which the carry signal is output, and a second terminal configured to receive the second clock signal; and a fourth transistor including a gate coupled to a second node, a first terminal configured to receive a gate off voltage, and a second terminal coupled to the carry output node.

6. The scan driver of claim 1, wherein the first circuit includes:

an input circuit configured to transfer the input signal to a third node in response to the first clock signal;

a stress relaxing circuit between the first node and the third node, and configured to transfer the input signal from the third node to the first node such that the voltage of the first node is changed to a first level;

a bootstrap circuit configured to change the voltage of the first node from the first level to a second level by bootstrapping the first node based on the second clock signal, the second level having an absolute value greater than an absolute value of the first level;

a holding circuit configured to hold a second node as an off level while the carry signal is output; and a stabilizing circuit configured to periodically apply a gate on voltage to the second node in response to the second clock signal, and to periodically apply a gate off voltage to the third node in response to the first clock signal after the carry signal is output.

7. The scan driver of claim 6, wherein the input circuit includes:

a fifth transistor including a gate configured to receive the first clock signal, a first terminal configured to receive the input signal, and a second terminal coupled to the third node.

8. The scan driver of claim 6, wherein the stress relaxing circuit includes:

a sixth transistor including a gate configured to receive the gate on voltage, a first terminal coupled to the third node, and a second terminal coupled to the first node.

9. The scan driver of claim 6, wherein the bootstrap circuit includes:

a first capacitor including a first electrode coupled to a carry output node at which the carry signal is output, and a second electrode coupled to the first node.

10. The scan driver of claim 6, wherein the holding circuit includes:

a seventh transistor including a gate coupled to the third node, a first terminal coupled to the second node, and a second terminal configured to receive the first clock signal.

11. The scan driver of claim 6, wherein the stabilizing circuit includes:

an eighth transistor including a gate configured to receive the first clock signal, a first terminal coupled to the second node, and a second terminal configured to receive the gate on voltage;

a ninth transistor including a gate coupled to the second node, a first terminal configured to receive the gate off voltage, and a second terminal;

a tenth transistor including a gate configured to receive the second clock signal, a first terminal coupled to the second terminal of the ninth transistor, and a second terminal coupled to the third node; and a second capacitor including a first electrode configured to receive the gate off voltage, and a second electrode coupled to the second node.

12. A display device comprising:

a display panel including a plurality of pixel rows;

a data driver configured to provide data signals to each of the plurality of pixel rows;

a scan driver configured to provide a plurality of scan signals to the plurality of pixel rows, respectively; and a controller configured to control the data driver and the scan driver, wherein the scan driver includes a plurality of stages, and each of the plurality of stages comprises:

a first circuit configured to transfer an input signal to a first node in response to a first clock signal;

a second circuit configured to output a second clock signal as a carry signal that is provided as the input signal for a next stage in response to a voltage of the first node; and a masking control circuit configured to receive a masking signal and the carry signal, wherein the masking control circuit includes:

a transistor configured to output the masking signal as a corresponding scan signal of the plurality of scan signals in response to the carry signal, wherein the masking signal has an on level or an off level according to a driving frequency of a panel region in a first active period of the carry signal, and wherein the masking control circuit is configured to output the corresponding scan signal having the on level based on the masking signal having the on level, and to output the corresponding scan signal having the off level based on the masking signal having the off level.

13. The display device of claim 12, wherein the controller includes:

a still image detector configured to divide input image data into a plurality of panel region data for a plurality of panel regions, each of the plurality of panel regions including at least one of the plurality of pixel rows, and to determine whether or not each of the plurality of panel region data represents a still image;

a driving frequency determiner configured to decide a plurality of driving frequencies for the plurality of panel regions according to whether each of the plurality of panel region data represents the still image; and a scan driver controller configured to generate the masking signal based on the plurality of driving frequencies for the plurality of panel regions.

14. The display device of claim 13, wherein the driving frequency determiner is configured to determine a first driving frequency of the plurality of driving frequencies for a first panel region of the plurality of panel regions as a normal driving frequency in a case where first panel region data of the plurality of panel region data for the first panel region represents a moving image, and to determine a second driving frequency of the plurality of driving frequencies for a second panel region of the plurality of panel regions as a low driving frequency lower than the normal driving frequency in a case where second panel region data of the plurality of panel region data for the second panel region represents the still image, wherein, to output a first scan signal of the plurality of scan signals in all of a plurality of frame periods to a first pixel row of the plurality of pixel rows included in the first panel region driven at the normal driving frequency, the scan driver controller is configured to generate the masking signal having an on level in all of active periods of the carry signal generated by a first stage of the plurality of stages coupled to the first pixel row, and wherein, to output a second scan signal of the plurality of scan signals in a portion of the plurality of frame periods to a second pixel row of the plurality of pixel rows included in the second panel region driven at the low driving frequency, the scan driver controller is configured to generate the masking signal having the on level in a portion of active periods of the carry signal generated by a second stage of the plurality of stages coupled to the second pixel row, and having an off level in a remaining portion of the active periods of the carry signal generated by the second stage.

15. The display device of claim 12, wherein the plurality of stages includes:

a plurality of odd-numbered stages coupled in series with each other, the odd-numbered stages being configured to provide corresponding scan signals of the plurality of scan signals to odd-numbered pixel rows of the plurality of pixel rows; and a plurality of even-numbered stages coupled in series with each other, the even-numbered stages being configured to provide corresponding scan signals of the plurality of scan signals to even-numbered pixel rows of the plurality of pixel rows.

16. The display device of claim 12, wherein a second active period of the masking signal in which the masking signal has the on level at least partially overlaps the first active period of the carry signal.

17. The display device of claim 16, wherein an end time point of the second active period of the masking signal leads an end time point of the first active period of the carry signal.

18. The display device of claim 12, wherein the first circuit includes:

an input circuit configured to transfer the input signal to a third node in response to the first clock signal;

a stress relaxing circuit between the first node and the third node, and configured to transfer the input signal from the third node to the first node such that the voltage of the first node is changed to a first level;

a bootstrap circuit configured to change the voltage of the first node from the first level to a second level by bootstrapping the first node based on the second clock signal, the second level having an absolute value greater than an absolute value of the first level;

a holding circuit configured to hold a second node as an off level while the carry signal is output; and a stabilizing circuit configured to periodically apply a gate on voltage to the second node in response to the second clock signal, and to periodically apply a gate off voltage to the third node in response to the first clock signal after the carry signal is output.

* * * * *